United States Patent
Sayyar-Rodsari et al.

(10) Patent No.: US 11,169,494 B2
(45) Date of Patent: Nov. 9, 2021

(54) PARAMETRIC UNIVERSAL NONLINEAR DYNAMICS APPROXIMATOR AND USE

(71) Applicant: ROCKWELL AUTOMATION TECHNOLOGIES, INC., Mayfield Heights, OH (US)

(72) Inventors: Bijan Sayyar-Rodsari, Austin, TX (US); Edward S Plumer, Georgetown, TX (US); Eric Hartman, Austin, TX (US); Celso Axelrud, Round Rock, TX (US); Kadir Liano, Pflugerville, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1087 days.

(21) Appl. No.: 14/659,003

(22) Filed: Mar. 16, 2015

(65) Prior Publication Data
US 2015/0185717 A1  Jul. 2, 2015

Related U.S. Application Data

(63) Continuation of application No. 10/842,157, filed on May 10, 2004.

(60) Provisional application No. 60/545,766, filed on Feb. 19, 2004.

(51) Int. Cl.
*G05B 13/04* (2006.01)
*G05B 17/02* (2006.01)

(52) U.S. Cl.
CPC ......... *G05B 13/048* (2013.01); *G05B 13/042* (2013.01); *G05B 17/02* (2013.01)

(58) Field of Classification Search
CPC .................................................... G06F 15/18
See application file for complete search history.

(56) References Cited

U.S. PATENT DOCUMENTS 5,377,307 A  12/1994  Hoskins et al.
5,479,571 A  12/1995  Parlos et al.
(Continued)

OTHER PUBLICATIONS

"Identification and Optimizing Control of a Rougher Flotation Circuit using an Adaptable Hybrid Neural Model," Minerals Eng., vol. 10, p. 707, 1997, by F. Cubillos and E. Lima (hereinafter "Cubillos").*

(Continued)

*Primary Examiner* — Tejal Gami
(74) *Attorney, Agent, or Firm* — Fletcher Yoder, P.C.

(57) ABSTRACT

System and method for modeling a nonlinear process. A combined model for predictive optimization or control of a nonlinear process includes a nonlinear approximator, coupled to a parameterized dynamic or static model, operable to model the nonlinear process. The nonlinear approximator receives process inputs, and generates parameters for the parameterized dynamic model. The parameterized dynamic model receives the parameters and process inputs, and generates predicted process outputs based on the parameters and process inputs, where the predicted process outputs are useable to analyze and/or control the nonlinear process. The combined model may be trained in an integrated manner, e.g., substantially concurrently, by identifying process inputs and outputs (I/O), collecting data for process I/O, determining constraints on model behavior from prior knowledge, formulating an optimization problem, executing an optimization algorithm to determine model parameters subject to the determined constraints, and verifying the compliance of the model with the constraints.

24 Claims, 9 Drawing Sheets

(56) References Cited

U.S. PATENT DOCUMENTS

| | | | |
|---|---|---|---|
| 5,487,952 | A | 1/1996 | Yoo et al. |
| 6,047,221 | A | 4/2000 | Piche et al. |
| 6,453,308 | B1 | 9/2002 | Zhao et al. |
| 6,882,992 | B1 | 4/2005 | Werbos |
| 7,065,511 | B2 | 6/2006 | Zhao et al. |
| 7,330,804 | B2 | 2/2008 | Turner et al. |
| 7,630,868 | B2 | 12/2009 | Turner et al. |
| 8,019,701 | B2 | 9/2011 | Sayyar-Rodsari et al. |
| 2002/0072828 | A1 | 6/2002 | Turner |
| 2002/0178133 | A1 | 11/2002 | Zhao et al. |
| 2004/0148144 | A1 | 7/2004 | Martin |
| 2008/0071394 | A1 | 3/2008 | Turner et al. |
| 2008/0208778 | A1 | 8/2008 | Sayyar-Rodsari et al. |
| 2010/0057222 | A1 | 3/2010 | Turner et al. |

OTHER PUBLICATIONS

Cubillos, et al., "Model Predictive Control Based on a Hybrid Neural Model," Brazilian Journal of Chemical Engineering, Sep. 12, 1995.

Duch, et al., "Transfer Functions: Hidden Possibilities for Better Neural Networks," Department of Computer Methods, Nicholas Copernicus University.

Gupta, et al., "Hybrid First-Principles/Neural Networks Model for Column Flotation," AIChE Journal, Mar. 1999, vol. 45, No. 3.

Hartman, Eric, "Training Feedforward Neural Networks with Gain Constraints," Neural Computation, vol. 12, pp. 811-829, (2000).

Hoegaerts, "Eigenspace Methods and Subset Selection in Kernel Based Learning," Thesis, Katholieke Universiteit Leuven, 2005, pp. 1-204.

Hovakimyan, N., et al., "Adaptive Output Feedback Control of Uncertain Multi-Input Multi-Output Systems Using Single Hidden Layer Neural Networks," American Control Conference, Anchorage, AK, May 8-10, 2002.

Moore, Ramon E., "Interval Analysis," Prentice-Hall, Inc., 1966.

Psichogios, et al., "A Hybrid Neural Network-First Principles Approach to Process Modeling," AIChE Journal, Oct. 1992, vol. 38, No. 10.

Thompson, et al., "Modeling Chemical Processes Using Prior Knowledge and Neural Networks," AIChE Journal, Aug. 1994, vol. 40, No. 8.

Turner, et al., "Introducing the State Space Bounded Derivative Network for Commercial Transition Control," Proceedings of the American Control Conference, Denver, Colorado, Jun. 4-6, 2003.

\* cited by examiner

PARAMETRIC UNIVERSAL NONLINEAR DYNAMICS APPROXIMATOR AND USE

PRIORITY DATA

This application is a continuation of U.S. application Ser. No. 10/842,157 titled "Parametric Universal Nonlinear Dynamics Approximator and Use", filed May 10, 2004, whose inventors were Bijan Sayyar-Rodsari, Edward Plummer, Eric Hartman, Kadir Liano, and Celso Axelrud, and which claims benefit of priority to U.S. Provisional Application 60/545,766 titled "Parametric Universal Nonlinear Dynamics Approximator and Use", filed Feb. 19, 2004, whose inventors were Bijan Sayyar-Rodsari, Edward Plummer, Eric Hartman, Kadir Liano, and Celso Axelrud, both of which are incorporated herein in their entireties.

BACKGROUND OF THE INVENTION

Field of the Invention

The present invention generally relates to the field of predictive modeling and control, and more particularly to a combined modeling architecture for building numerically efficient dynamic models for systems of arbitrary complexity.

Description of the Related Art

Many systems or processes in science, engineering, and business are characterized by the fact that many different inter-related parameters contribute to the behavior of the system or process. It is often desirable to determine values or ranges of values for some or all of these parameters which correspond to beneficial behavior patterns of the system or process, such as productivity, profitability, efficiency, etc. However, the complexity of most real world systems generally precludes the possibility of arriving at such solutions analytically, i.e., in closed form. Therefore, many analysts have turned to predictive models and optimization techniques to characterize and derive solutions for these complex systems or processes.

Predictive models generally refer to any representation of a system or process which receives input data or parameters related to system or model attributes and/or external circumstances/environment and generates output indicating the behavior of the system or process under those parameters. In other words, the model or models may be used to predict behavior or trends based upon previously acquired data. There are many types of predictive models, including linear, non-linear, analytic, and empirical (e.g., statistical) models, among others, several types of which are described in more detail below.

Optimization generally refers to a process whereby past (or synthesized) data related to a system or process are analyzed or used to select or determine optimal parameter sets for operation of the system or process. For example, the predictive models mentioned above may be used in an optimization process to test or characterize the behavior of the system or process under a wide variety of parameter values. The results of each test may be compared, and the parameter set or sets corresponding to the most beneficial outcomes or results may be selected for implementation in the actual system or process.

FIG. 1 illustrates a general optimization process as applied to an industrial system or process 104, such as a manufacturing plant, according to the prior art. It may be noted that the optimization techniques described with respect to the manufacturing plant are generally applicable to all manner of systems and processes. More specifically, FIG. 1 illustrates an optimization system where a computer based optimization system 102 operates in conjunction with a process (or system) 104 to optimize the process, according to the prior art. In other words, the computer system 102 executes software programs (including computer based predictive models) that receive process data 106 from the process 104 and generate optimized decisions and/or actions, which may then be applied to the process 104 to improve operations based on specified goals and objectives.

Thus, many predictive systems may be characterized by the use of an internal model (e.g., a mathematical model) that represents a process or system 104 for which predictions are made. As mentioned above, predictive model types may be linear, non-linear, stochastic, or analytical, among others.

Generally, mathematical models are developed using one of two approaches (or a combination of both). One approach is to conceptually partition the system into subsystems whose properties are well understood, e.g., from previous experience or use. Each subsystem is then modeled using physical or natural laws and other well-established relationships that have their roots in earlier empirical work. These subsystems are then joined mathematically and a model of the whole system is obtained. The other approach to developing mathematical models is directly based on experimentation. For example, input and output signals from the system being modeled are recorded and subjected to data analysis in order to infer a model. Note that as used herein, static nonlinearity in the input/output mapping of a system is viewed as a special case of the general nonlinear dynamic input/output mapping, and hence the techniques described are also applicable when only a static input/output mapping is to be modeled.

The first approach is generally referred to as first-principles (FP) modeling, while the second approach is commonly referred to as empirical modeling (although it should be noted that empirical data are often used in building FP models). Each of these two approaches has substantial strengths and weaknesses when applied to real-world complex systems.

For example, regarding first-principles models:

1. FP models are built based on the science underlying the process being modeled, and hence are better suited for representing the general process behavior over the entire operational regime of the process.

However:

2. First-principles information is often incomplete and/or inaccurate, and so the model and thus its outputs may lack the accuracy required.

3. Tuning of the parameters in the model is needed before the model could be used for optimization and control.

4. FP models may be computationally expensive and hence useful for real-time optimization and control only in slower processes. This is particularly apparent when the outputs in FP models are not explicit. For example, consider a model of the form $G(y_k, u_k, x_k)=0$, where the output vector $y_k$ is an implicit function of input vector $u_k$, state vector $x_k$. In this case, an internal solver is needed to solve for $y_k$ at each interval.

5. When the process changes, modification of the first principles model is generally expensive. For example, designed experiments may be necessary to obtain or generate the data needed to update the model.

Regarding empirical models:

1. Since data capture the non-idealities of the actual process, where data are available, an empirical model can often be more accurate than a first-principles model.

However:

2. The available data are often highly correlated and process data alone is not sufficient to unambiguously break the correlation. This is particularly apparent when process operation is recipe-dominated. For example, in a linear system with 2 inputs and 1 output, a recipe may require two inputs to move simultaneously, one to increase by one unit and the other to decrease by one unit. If the output increases by one unit, the sign and value of the gain from the two inputs to the output cannot be uniquely determined based on these data alone.

3. Additional designed experiments are often needed in order to produce the necessary data for system identification; however, designed experiments disrupt the normal operation of the plant and hence are thus highly undesirable.

4. Certain regions or regimes of operation are typically avoided during plant operation, and hence the representative data for that region may not be available.

The complementary strengths and weaknesses of these two modeling routes are widely recognized, and efforts that combine the two are reported in the literature, some examples of which are described below.

One approach for using both FP information/models and empirical data is to develop combined models. For example, in "Modeling Chemical Processes Using Prior Knowledge and Neural Networks," AIChE Journal, vol. 40, p. 1328, 1994, by M. Thompson and M. Kramer, (Thompson (1994)), a proposal is made to combine first-principles models with empirical nonparametric models, such as neural network models, in a hybrid architecture to model complex chemical processes, illustrated in FIG. 2. As FIG. 2 shows, inputs 201 are provided to a default parametric model 202 and a non-parametric model 204 (e.g., a neural network), whose combined (and optionally processed) outputs Z 205 are provided as input to a static nonlinear model 404, which then generates outputs 207. In Thompson's proposed hybrid architecture the neural network (nonparametric model) 204 is responsible for learning the difference between the default FP model 202 and the target data. Although the neural network is a nonparametric estimator capable of approximating this difference, it is also required to provide a negligible contribution to the model output for inputs far from the training data. In other words, the nonparametric model is required to contribute substantially in the operational range of the system, but not outside of this range. The training of the neural network in Thompson is therefore formulated as a semi-infinite programming (SIP) problem (reducible to a constrained nonlinear programming (NLP) problem if all inequalities are finite or infinite inequalities can be transformed into finite constraints) for which SIP solvers (constrained NLP algorithms in the case of NLP problem) may be used for training.

Another example of a combined model is described in "Identification and Optimizing Control of a Rougher Flotation Circuit using an Adaptable Hybrid Neural Model," Minerals Eng., vol. 10, p. 707, 1997, by F. Cubillos and E. Lima (Cubillos (1997)), where a neural network model is used to model reaction rates for an ideal Continuous Stir Tank Reactor (CSTR) as a function of temperature and output concentration. In this example, the input and output data for the training of the neural network model is generated synthetically using the ideal CSTR model. Therefore, the neural network model is trained with explicit data for inputs/outputs of the neural network block in the combined model. In other words, the neural network block is detached from the combined model structure for training purposes, and is included in the combined model structure for optimization and control after training. Cubillos shows that the combined model has superior generalization capability compared to the neural network models alone, and that the modeling process was easier than synthesizing a FP model based on physical considerations.

In "Hybrid First-Principles/Neural Networks Model for Column Flotation," AIChE Journal, vol. 45, p. 557, 1999, by S. Gupta, P. Liu, S. Svoronos, R. Sharma, N. Abdel-Khalek, Y. Cheng, and H. El-Shall (Gupta (1999)), yet another example of a combined model is presented, where the combined model is used for phosphate column flotation. In this approach, the FP model is obtained from material balances on both phosphate particles and gangue (undesired material containing mostly silica). Neural network models relate the attachment rate constants to the operating variables. A nonlinear optimizer in the form of a combination of simulated annealing and conjugate gradient algorithm is used for the training of the neural network models.

An alternative approach to combining FP knowledge and empirical modeling is to use FP information to impose constraints on the training of the empirical model. An example of this approach is reported in E. Hartman, "Training feedforward neural networks with gain constraints," Neural Computation, vol. 12, pp. 811-829, April 2000 (Hartman (2000)), where gain information is used as constraints for the training of the neural network models. Hartman develops a method for training feedforward neural networks subject to inequality or equality-bound constraints on the gains (i.e., partial derivatives of outputs with respect to inputs) of the learned mapping. Hartman argues that since accurate gains are essential for the use of neural network models for optimization and control, it is only natural to train neural network models subject to gain constraints when they are known through additional means (such as, for example, bounds extracted from FP models or operator knowledge about the sign of a particular gain).

A further example of including first principles knowledge in the training of an empirical model is a bounded derivative network (BDN) (i.e., the analytical integral of a neural network) as described in "Introducing the state space bounded derivative network for commercial transition control," IEEE American Control Conference, June 2003, by P. Turner, J. Guiver, and B. Lines of Aspen Technology, Inc. (Turner (2003)), and illustrated in FIG. 3. In this reference the BDN is proposed as a universal nonlinear approximator. As FIG. 3 shows, in this approach, a state space model 302 is coupled to the BDN 304, and inputs 301 are received by the state space model 302 and by the BDN 204. Based on the received input 301, the state space model then provides state information 303 to the GDN 204, as shown, and, based on the received inputs 301 and the received states 303, the BDN generates output predictions 307. As indicated by the name "bounded derivative network", the parameters of the nonlinear approximator are trained through the application of a constrained NLP solver where one set of potential constraints is the bounds on input/output gains in the model.

Prior art approaches to using combined models (as described above) have used neural network models to represent the variation in a specific set of parameters in a FP model. The overall model is therefore the original FP model with some of its parameters varying depending on the input(s)/state(s) of the system. These prior art approaches are generally inadequate in the following situations:

1. When the FP model does not fully describe the process. For example, if FP information for only a part of the process is known, a combined model of the process that is appropriate for optimization and control cannot be built based on the prior art techniques (e.g., using the system of FIG. 2), even if representative measurements of all the relevant process variables are available.

2. When the FP model only implicitly describes the relationship between inputs/states/parameters/outputs. The prior art approaches do not address the issue of training a neural network that models the parameters of an implicit FP model.

3. When higher-order fidelity of the input/output mapping (such as first or second order derivatives of the outputs with respect to the inputs) is critical to the usability of the combined model for optimization and control. Prior art does not address the imposition of such constraints in the training of neural network models in the context of combined models as depicted in FIG. 2.

While the system described in Turner (2003) does address the issue of gain constraints in the proposed bounded-derivative-network (BDN), the training of the BDN is performed with explicit access to inputs and outputs of the trained model (similar to conventional training of a stand-alone neural network by a NLP solver), and the issue of bounded derivatives when a FP block appears in series with the output of the BDN is not addressed. More specifically, the bounded derivative network of Turner is used in a Wiener model architecture or structure (i.e. in a series connection with a linear state space model) to construct a nonlinear model for a physical process. The Weiner model architecture is illustrated in FIG. 4A, where a static nonlinear model follows a linear dynamic model 402. Thus, the BDN of FIG. 3 may be considered a special case of the Weiner model of FIG. 4A.

According to the Wiener model structure, the modification of the BDN will only affect the effective gain(s) between the inputs and outputs of the model. The identification of the dynamic behavior of the physical process occurs prior to the training of the BDN, and so changes in the state space model may require re-training of the BDN model. Indeed, the entire theory behind the training of the BDN in Turner (2003) is developed to ensure accurate representation of the process gains in the model. In an alternative but similar approach, FIG. 4B illustrates a Hammerstein model, where the nonlinear static model 404 precedes the linear dynamic model 402. Similar to the Weiner model structure, the nonlinear static model 404 and the linear dynamic model 402 are developed or trained in isolation of each other, and so modifications in the dynamic model 402 generally requires re-training of the nonlinear static model 404. Further information regarding Weiner and Hammerstein models may be found in Adaptive Control, 2nd Edition. 1994, by K. Astrom and B. Wittenmark.

Thus, improved systems and methods for combined models and their use are desired.

SUMMARY OF THE INVENTION

The present invention comprises various embodiments of a system and method for modeling nonlinear process or systems. More specifically, a parametric universal nonlinear dynamics approximator (PUNDA), also referred to as a PUNDA model, and its use are described.

In one embodiment, the PUNDA model includes a nonlinear approximator, coupled to a dynamic parameterized model in series. The nonlinear approximator may be a neural network, although any type of nonlinear approximator may be used, including for example, support vector machines, statistical models, parametric descriptions, Fourier Series models, or any other type of empirical or data based model, among others. In a preferred embodiment, the nonlinear approximator is a universal nonlinear approximator, such that any type of nonlinear mapping may be implemented. The nonlinear approximator operates to provide parameters to the dynamic parameterized model. In some embodiments, the nonlinear approximator (e.g., neural network) may also include a feedback loop, whereby the output of the approximator is provided as further input to itself, thus supporting dependencies of the output upon prior output of the approximator. In some embodiments, the dynamics approximator may reduce to a static function.

In a preferred embodiment, the dynamic parameterized model may be a multi-input, multi-output (MIMO) dynamic model implemented with a set of difference equations, i.e., a set of discrete time polynomials. Thus, the dynamic parameterized model may receive its parameters from the nonlinear approximator, and operate accordingly.

The PUNDA model may be coupled to a physical process or a representation of the process. Process inputs may be provided to the process and to the PUNDA model as input. The process produces process outputs, which may be combined or used with PUNDA model outputs to determine model errors, which may then be provided back to the PUNDA model and used, e.g., with an optimizer, to train the PUNDA model.

Although the PUNDA model is described below in terms of a series combination of a neural network model and a set of MIMO difference equations that can be used to model any complex nonlinear dynamic system with any desired degree of accuracy, as noted above, other nonlinear approximators and dynamic parameterized models are also contemplated. For example, in various embodiments, the physical process may be described or represented by the process itself, a first principles model, empirical data, or any combination of the three. For simplicity, in this training configuration of the system, the representation of the process may be referred to as the process.

The PUNDA model disclosed herein allows the empirical information and/or the first-principles knowledge available about the process to be systematically used in building a computationally efficient model of the physical process that is suitable for online optimization and control of the process, i.e., substantially in real time. Additionally, such a model may be capable of approximating the nonlinear physical process with any desired degree of accuracy.

It is noted that partial FP models that by themselves are not sufficient to fully describe a physical process (and hence are currently ignored in practice) could be used to build a representative model of the physical process with the proposed PUNDA structure. The neural network block in the PUNDA model may be trained while it is serially connected to the MIMO difference equation block, and hence, in general, the output of the neural network model may not be directly available. It is expected that the complexities of the real world physical processes may dictate the need for the training of the neural network model under such combined architecture in a majority of the applications, and indeed, such integrated training is a primary feature and benefit of the present invention.

A preferred methodology for the training of the neural network model within the PUNDA architecture is to formulate the training of the neural network parameters as a constrained nonlinear programming problem, which may then be solved with any appropriate NLP solver technology (e.g., Sequential Quadratic Programming (SQP)). The parameters of the neural network model may include: (a) parameters that determine the topology of the neural network model (e.g. number of layers, connectivity of the network), (b) parameters that determine the type/shape of the activation function used at each node, and/or (c) weights/biases in the network, among others.

It is generally accepted that a successful model for optimization and control must accurately capture both process gains and dynamics. To ensure the high fidelity of the combined PUNDA model for optimization and control, the constrained NLP problem for the training of the neural network model may include constraints on the derivatives (of any desired order) of the process outputs with respect to the process inputs. Other constraints, such as, for example, mass and energy balances, may also be included.

In addition to the derivative constraints (the first order of which are commonly referred to as gain constraints in the literature), the training of the neural network block in the PUNDA model can be constrained to ensure desired dynamic behavior for the PUNDA model. For example, a time constant in the system may be bounded to a certain range based on prior knowledge about the physics of the process. This is a key attribute that distinguishes the PUNDA model from prior art approaches.

In one embodiment, the PUNDA model may be part of an industrial prediction/control system. For example, the PUNDA model may receive process outputs from the physical process and provides model output to a controller, which in turn provides controller output to a distributed control system (DCS). Note that the controller preferably includes an optimizer which receives, and operates according to, optimizer constraints, as is well known in the art. As is also well known, the DCS may operate to filter or otherwise provide checks or other processing regarding the controller output, e.g., for safety purposes, and to provide process inputs to the physical process, as well as the controller and PUNDA model. Of course, other components, such as pre- or post-processors may also be included as desired, such as, for example, between the process and the PUNDA model, for processing the process output data, etc.

The (trained) PUNDA model may thus operate to control the process in an adaptive or dynamic manner. Further details regarding the PUNDA model and its training and use are provided below.

One embodiment of a method for training a model of a nonlinear process is presented below for an embodiment of the PUNDA model using a neural network and a set of MIMO difference equations, although it should be noted that the method is broadly applicable to other types of PUNDA models, and to other types of nonlinear models in general.

First, process inputs/outputs (I/O), i.e., I/O parameters, to be included in the model may be identified, e.g., material inputs and outputs, conditions, such as temperature and pressure, power, costs, and so forth, e.g., via expert knowledge, programmatically through systematic search algorithms, such as correlation analysis, or other approaches or techniques.

Data for the process input(s)/output(s) may be collected, e.g., from historical data available from plant normal operation, from other models, assembled or averaged from multiple sources, or collected substantially in real time from an operating process, e.g., from an online source. One or more signal processing operations may optionally be performed on the data, including for example, filtering the data to reduce noise contamination in the data, removing outlier data from the data set (i.e., anomalous data points), data compression, variable transformation, and normalization, among others.

Prior knowledge about the process may optionally be assembled or gathered, e.g., operator knowledge regarding the sign of a particular gain, or a residence time in the system, a partial or complete first principles model of the process, e.g., in the form of a set of nonlinear differential or partial differential equations, among approaches. Well known methodologies exist to determine or extract constraints, such as derivatives of the outputs with respect to inputs (commonly referred to as gains), from first principles models or information. The prior knowledge may be processed to determine or create the constraints for the training problem. For example, commercially available software may be used to derive analytical expressions for the first or higher order derivatives of the outputs with respect to the inputs, including these derivatives in the constraints.

An order for the MIMO difference equations may be determined, i.e., the order of the equations comprised in the parameterized dynamic model may be determined. For example, in one embodiment, the order may be determined by an expert, i.e., one or more human experts, or by an expert system. In another embodiment, the order may be determined as a result of a systematic optimization problem, in which case the determination of the order of the model may be performed simultaneously or concurrently with the training of the model.

An optimization problem may be formulated in which model parameters are or include decision variables, e.g., where an objective function operates to minimize model errors subject to a set of constraints. Optimization algorithms may be executed or performed to determine the parameters (i.e., values of the parameters) of the PUNDA model.

Finally, satisfaction of the constraint set may be verified and the value of the objective function may be computed. If the constraints are not satisfied, or the objective value is not sufficiently small, formulating and solving the model optimization task may be repeated one or more times, e.g., via the use of heuristics or through the application of systematic analysis techniques, among others. For example, in a preferred embodiment, the data-independent gains of the model may be verified using interval arithmetic over the global input region and/or interval arithmetic with input-region partitioning.

One embodiment of a method of operation of the PUNDA model in a control application for a physical process, e.g., a physical plant, is described, where the PUNDA model couples to the physical process, and also to a controller which operates to manage or control the process based on outputs from the PUNDA model. As mentioned earlier, however, the methods presented herein are also contemplated as being broadly applicable in a wide variety of application domains, including both physical and non-physical (e.g., analytical) processes.

The model may be initialized to a current status of the physical process to be controlled, e.g., to ensure that the PUNDA model and the physical plant are correctly aligned, and thus that the predictions produced by the PUNDA model are relevant to the physical process. In various embodiments, the initialization may be performed by a human expert, and expert system, or via a systematic methodology of identifying the initial conditions of the model given available current and past measurements from the physical process, among others.

Various attributes or parameters of the combined model and process may be determined or defined, such as, for example, control variable and manipulated variable (CV and MV) target profiles, CV/MV constraint profiles, disturbance variable (DV) profiles, prediction and control horizons, objective function and constraints, and tuning parameters for the controller, among others.

A profile for the MV moves or changes, i.e., a trajectory of the MV values, over the control horizon may be generated, and the model's response over the prediction horizon may be observed, and the deviation from the desired behavior determined. In one embodiment, the MV profiles may be determined by a human operator, although in a preferred embodiment, the MV profiles may be determined programmatically, e.g., by an optimization algorithm or process. The model response to the presumed MV profile may be calculated over the prediction horizon and compared to the desired behavior and constraints. The appropriateness or suitability of the MV profile may be measured or evaluated by or via corresponding value or values of the objective function.

Then, an optimal MV profile may be determined. For example, in a preferred embodiment, the generation of the a trajectory and determination of the deviation from the desired behavior may be performed iteratively with different MV profiles until a satisfactory predicted system response is obtained, preferably by using an optimizer to systematically search for the optimal MV profiles, e.g., by systematically seeking those MV moves or changes for which the objective function is improved (e.g. minimized when the objective function reflects the control cost) while respecting constraints. The determined optimal MV profile may be considered or referred to as a decision, and the corresponding model response may be considered or referred to as the predicted response of the process.

Information related to or indicating the MV profiles and corresponding model response (e.g., MV profiles and predicted system response) may optionally be displayed and/or logged, as desired. A portion or the entirety of the decision (MV) profiles may be transmitted to a distributed control system (DCS) to be applied to the physical system. In one embodiment, final checks or additional processing may be performed by the DCS. For example, the DCS may check to make sure that a decision (e.g., a value or set of values of the manipulated variables) does not fall outside a range, e.g., for safety. If the value(s) is/are found to be outside a valid or safe range, the value(s) may be reset, and/or an alert or alarm may be triggered to call attention to the violation.

The output of the DCS, e.g., the (possibly modified) decision profiles, may be provided as actual input to the physical process, thereby controlling the process behavior, and the input to the physical process (i.e., the output of the DCS) and the actual process response (i.e., the actual process outputs) may be measured. In a preferred embodiment, the information may be fed back to the PUNDA model, where the actual process input/output measurements may be used to improve the estimate of the current status of the process in the model, and to produce a new deviation from the desired system response. The method may then repeat, dynamically monitoring and controlling the process in an ongoing manner, attempting to satisfy the objective function subject to the determined or specified constraints.

In one embodiment, the input/output of the process may be used to continue training the PUNDA model online. Alternatively, in other embodiments, the model may be decoupled intermittently for further training, or, a copy of the model may be created and trained offline while the original model continues to operate, and the newly trained version substituted for the original at a specified time or under specified conditions.

BRIEF DESCRIPTION OF THE DRAWINGS

A better understanding of the present invention can be obtained when the following detailed description of the preferred embodiment is considered in conjunction with the following drawings, in which.

Figure 1:
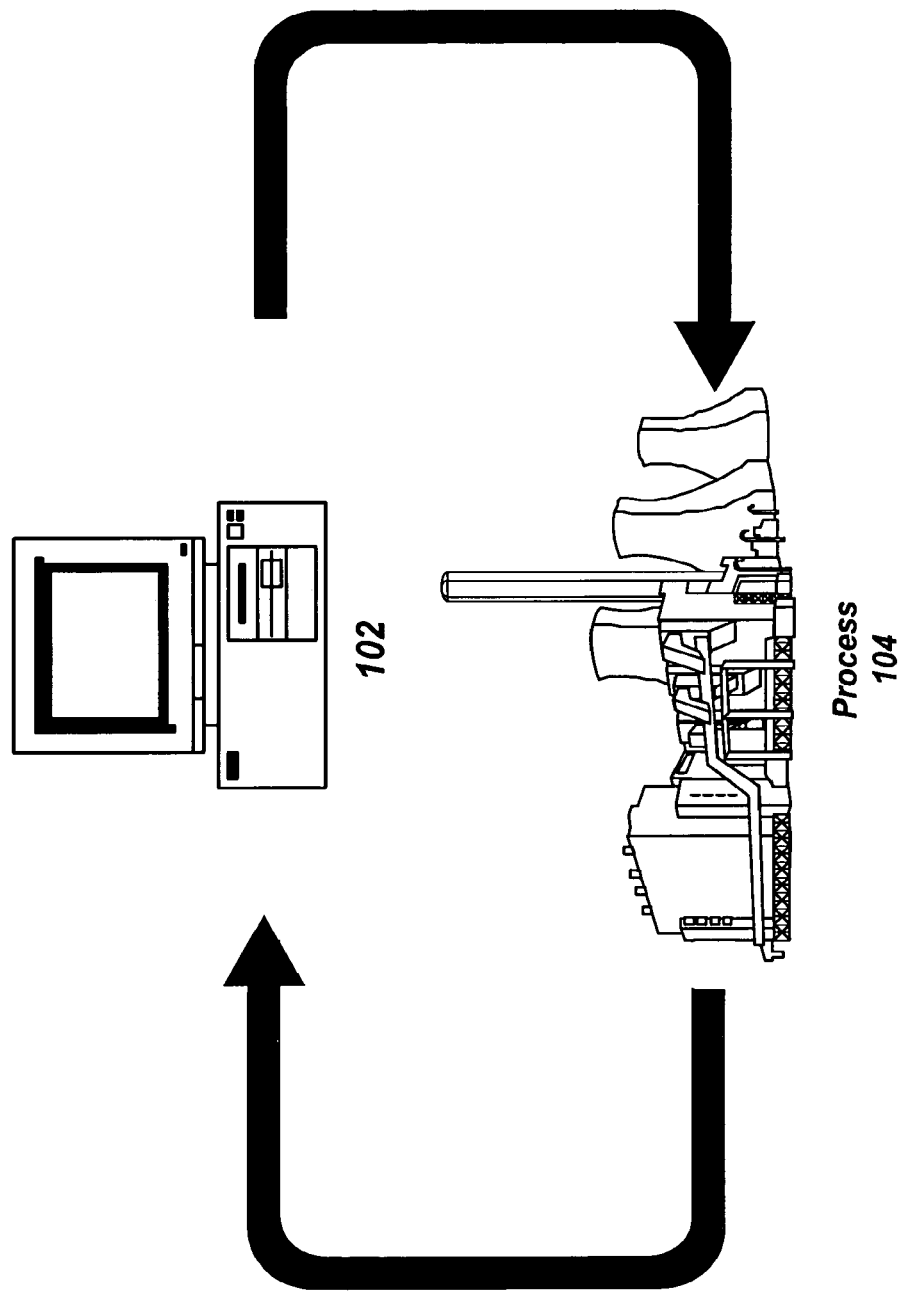
FIG. 1 an optimization system where a computer based optimization system operates in conjunction with a process to optimize the process, according to the prior art.
Figure 2:
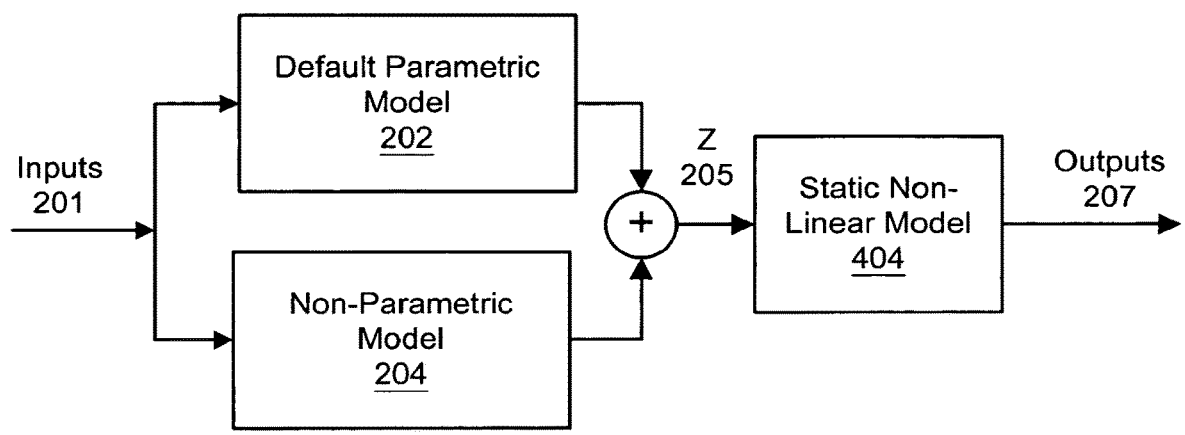
FIG. 2 is a block diagram of a combined model using parametric and nonparametric models, according to the prior art.
Figure 3:
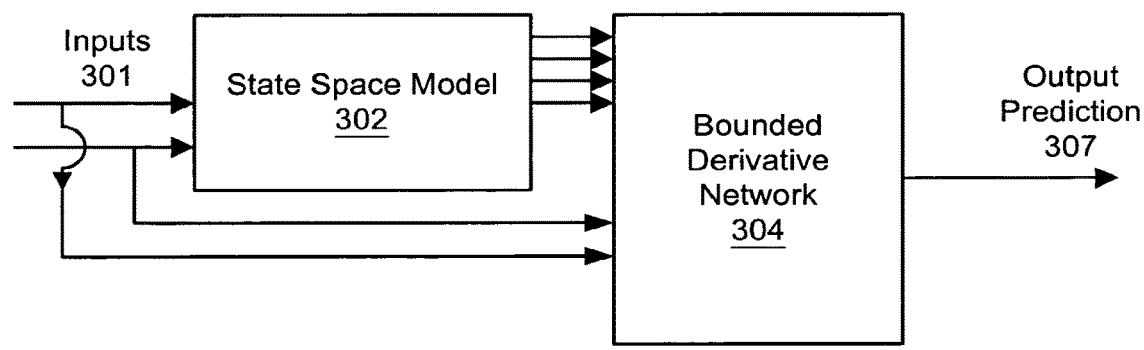
FIG. 3 illustrates a state space bounded derivative network, according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE EMBODIMENTS

Incorporation by Reference

The following references are hereby incorporated by reference in their entirety as though fully and completely set forth herein:

U.S. patent application Ser. No. 10/350,830, titled "Parameterizing a Steady State Model Using Derivative Constraints", filed Jan. 24, 2003, whose inventor was Gregory D. Martin.

Terms

The following is a glossary of terms used in the present application:

Objective Function—a mathematical expression of a desired behavior or goal.

Constraint—a limitation on a property or attribute used to limit the search space in an optimization process.

Optimizer—a tool or process that operates to determine an optimal set of parameter values for a system or process by solving an objective function, optionally subject to one or more constraints.

Control Variables—process outputs, e.g., output states of the process or system being controlled.

Manipulated Variables—manipulable inputs to the process being controlled.

Disturbance Variables—inputs which are not manipulable, e.g., ambient temp/pressure, etc., that affect the process, but which are not controllable Target Profile—a desired profile or trajectory of variable values, i.e., a desired behavior of a variable, e.g., of a control variable or manipulated variable.

Control Horizon—the period of the time extending from the present into the future in which one plans to move or change manipulated variables. Beyond this horizon the MV is assumed to stay constant at its last or most recent value in the control horizon.

Prediction Horizon—the period of time extending from the present into the future over which the process or system response is monitored and compared to a desired behavior. A prediction horizon is usually greater than the control horizon.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Figure 5A:
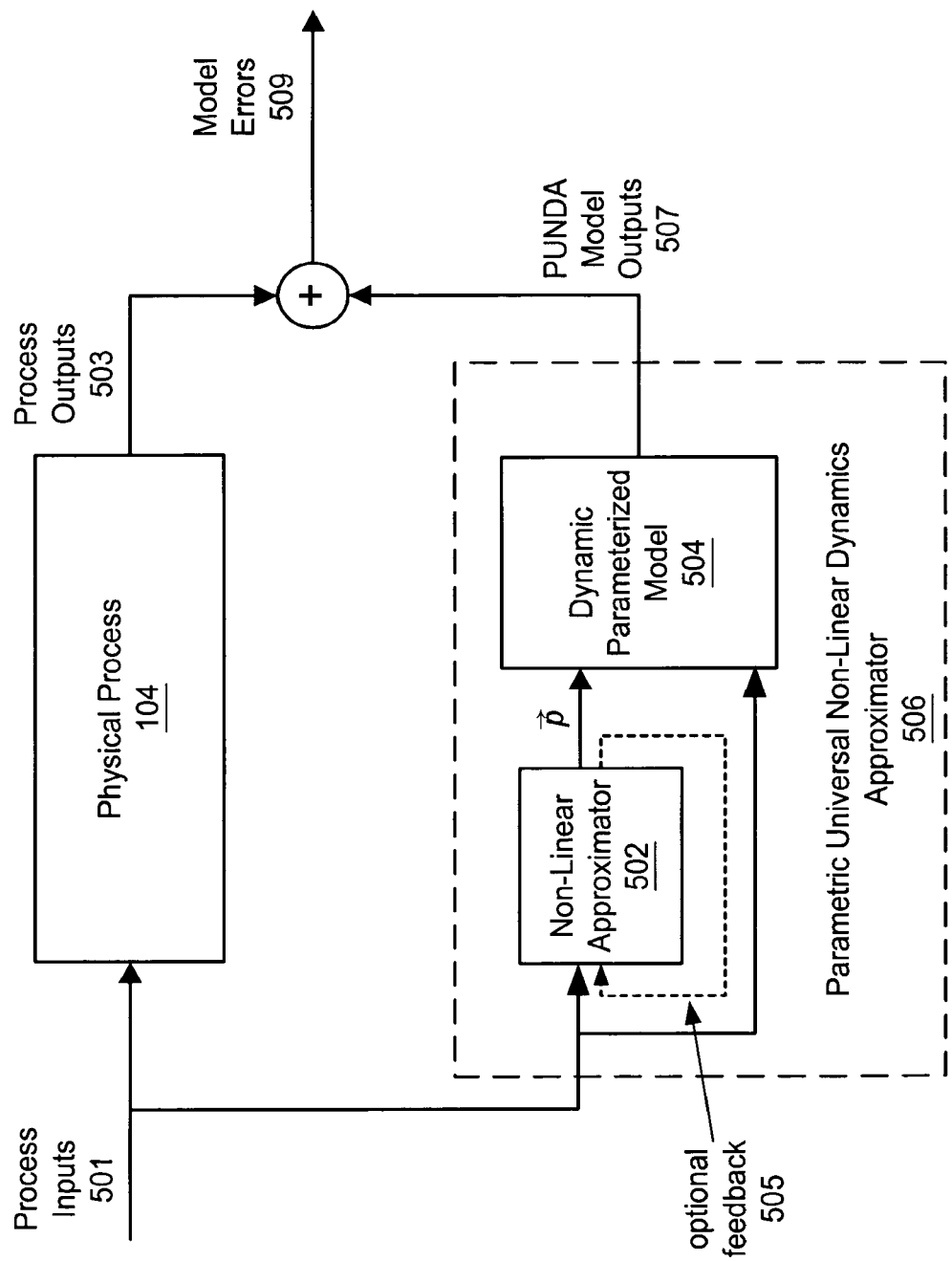
FIG. 5A illustrates a parametric universal non-linear dynamics approximator in a training configuration, according to one embodiment of the invention.
Figure 5B:
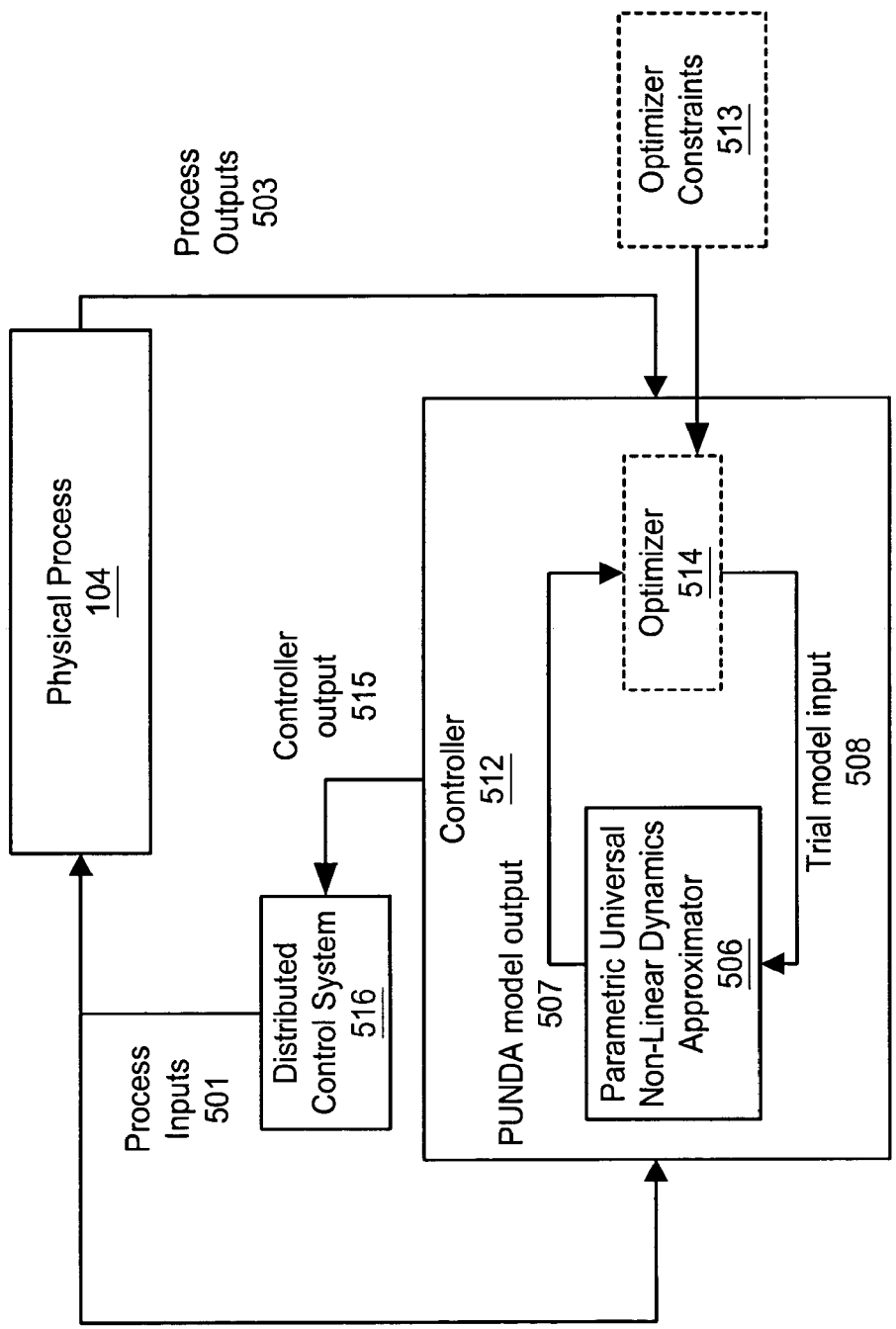
FIG. 5B illustrates the parametric universal non-linear dynamics approximator of FIG. 5A in an industrial control system, according to one embodiment of the invention.

FIGS. 5A and 5B—A Parametric Universal Nonlinear Dynamics Approximator

FIGS. 5A and 5B illustrate a parametric universal nonlinear dynamics approximator (PUNDA), according to one embodiment. It should be noted that the block diagrams of FIGS. 5A and 5B are simplified depictions and are intended to be exemplary only. In other words, there are components that may be required in actual systems which are omitted in the figures for clarity, such as, for example controller blocks, optimizers, input and output processors, and so forth, these items not being necessary to understand the present invention. FIG. 5A is a high level block diagram of a PUNDA model 506, which uses a new architecture for combined models, coupled to a physical process (or system) 104 or representation thereof, for purposes of training the PUNDA model 506. FIG. 5B is a block diagram illustrating the use of the PUNDA model in an industrial system. The PUNDA model may be stored on a memory medium of a computer system, and executed by a processor to implement the operations described herein.

As FIG. 5A shows, in this embodiment, the PUNDA model 506 includes a nonlinear approximator 502, coupled to a dynamic parameterized model 504 in series. In one embodiment, the nonlinear approximator 502 may be a neural network, although any type of nonlinear approximator may be used, including, for example, support vector machines, statistical models, parametric descriptions, Fourier series models, or any other type of empirical or data based model, among others. In a preferred embodiment, the nonlinear approximator is a universal nonlinear approximator, such that any type of nonlinear mapping may be implemented. The nonlinear approximator 502 operates to provide parameters $\vec{p}$ to the dynamic parameterized model 504, as shown. As indicated, in some embodiments, the nonlinear approximator (e.g., neural network) 502 may also include a feedback loop 505, whereby the output of the approximator is provided as further input to itself, thus supporting dependencies of the output upon prior output of the approximator.

In a preferred embodiment, the dynamic parameterized model 504 may be a multi-input, multi-output (MIMO) dynamic model implemented with a set of difference equations, i.e., a set of discrete time polynomials, an example of which is provided below. Thus, the dynamic parameterized model 504 may receive its parameters $\vec{p}$ from the nonlinear approximator 502, and operate accordingly.

As also shown in FIG. 5A, the PUNDA model 506 may be coupled to the physical process 104 or a representation of the process 104. Process inputs 501 may be provided to the process 104 and to the PUNDA model 506 as input. The process 104 produces process outputs 503, which may be combined or used with PUNDA model outputs 507 to determine model errors 509, as shown. These model errors 509 may then be provided back to the PUNDA model and used, e.g., with an optimizer, to train the PUNDA model.

In the descriptions that follow, the PUNDA model 506 is described in terms of a series combination of a neural network model and a set of MIMO difference equations that can be used to model any complex nonlinear dynamic system with any desired degree of accuracy, although, as noted above, other nonlinear approximators and dynamic parameterized models are also contemplated.

For example, in various embodiments, the physical process 104 of FIG. 5A may be described or represented by the process itself, a first principles model, empirical data, or any combination of the three, among others. Examples of first principles models include a state space description of the process in the form of $x_{k+1}=F_k(x_k, u_k, p_k)$, $y_k=G_k(x_k, u_k, p_k)$, or input/output difference equations in the form of $y_k=G_k(y_{k-1}, \ldots, y_{k-N}, u_k, \ldots, u_{k-M}, p_k)$. Here $x_k$ is the state vector, $u_k$ is the input vector (manipulated or disturbance variables), $p_k$ is the parameter vector, and $y_k$ is the output vector for the process. Examples of empirical data include test data for all process inputs/outputs, or correlated measurements from normal operation of the process, e.g., plant, for certain input/output pairs. Other representations are also contemplated, including, for example, statistical models, parametric descriptions, Fourier series models, and empirical models, among others. For simplicity, in this training configuration of the system, the representation of the process may be referred to as the process 104.

The PUNDA model disclosed herein allows the empirical information and/or the first-principles knowledge available about the process to be systematically used in building a computationally favorable (i.e., efficient) model of the physical process that is suitable for online optimization and control of the process. In other words, the computations may be made substantially in real time. Additionally, such a model may be capable of approximating the nonlinear physical process with any desired degree of accuracy, as will be described in detail below.

It is noted that partial FP models that by themselves are not sufficient to fully describe a physical process (and hence are currently ignored in practice) could be used to build a representative model of the physical process with the proposed PUNDA structure. The neural network block 502 in the proposed PUNDA model may be trained while it is serially connected to the MIMO difference equation block 504, and hence, in general, the output of the neural network model 502 may not be directly available. It is expected that the complexities of the real world physical processes may dictate the need for the training of the neural network model 502 under such combined architecture in a majority of the applications, and indeed, such integrated training is a primary feature and benefit of the present invention.

A preferred methodology for the training of the neural network model 502 within the PUNDA architecture of FIG. 5A is to formulate the training of the neural network parameters as a constrained nonlinear programming problem. This constrained NLP problem may then be solved with any appropriate NLP solver technology (e.g., Sequential Quadratic Programming (SQP)). The parameters of the neural network model may include: (a) parameters that determine the topology of the neural network model (e.g. number of layers, connectivity of the network), (b) parameters that determine the type/shape of the activation function used at each node, and/or (c) weights/biases in the network, among others.

It is generally accepted that a successful model for optimization and control must accurately capture both process gains and dynamics. To ensure the high fidelity of the combined PUNDA model for optimization and control, the constrained NLP problem for the training of the neural network model 502 may include constraints on the derivatives (of any desired order) of the process outputs with respect to the process inputs. Other constraints, such as, for example, mass and energy balances, may also be included. Potential sources of information for such constraints include first principle models and operator knowledge. A variety of techniques may be used to translate such information into constraints for the NLP problem. For example, one approach is to use commercially available software, such as, for example, Maple, provided by Waterloo Maple, Inc., to derive analytical expressions for the first (or higher order) derivatives of the outputs with respect to inputs in extremely sophisticated first principles models. The derived expressions may then be included in the constraint set for the NLP problem of neural network training. For further information regarding the use of derivative constraints for parameterizing models, please see U.S. patent application Ser. No. 10/350,830, titled "Parameterizing a Steady State Model Using Derivative Constraints", which was incorporated by reference above.

In addition to the derivative constraints (the first order of which are commonly referred to as gain constraints in the literature), the training of the neural network block in the PUNDA model can be constrained to ensure desired dynamic behavior for the PUNDA model. For example, a time constant in the system may be bounded to a certain range based on prior knowledge about the physics of the process. This is a key attribute that distinguishes the PUNDA model from prior art approaches.

Thus, in contrast to the Weiner and Hammerstein model architectures described earlier, in the PUNDA model disclosed herein, the notion of decomposing the nonlinear dynamic behavior of a physical system into linear (or even nonlinear) dynamics and static input/output mappings is completely avoided. In the PUNDA model, the identification of the dynamic behavior of the physical process and the input/output static mappings (i.e. gain relationships) are performed simultaneously. The nonlinear approximator block 502, e.g., neural network, in the PUNDA model 506 specifies how the parameters of the dynamic parameterized model 504, e.g., the MIMO difference equation block, may vary as a function of process operating conditions, and gain and dynamic behavior of the PUNDA model is a global property of the entire PUNDA model. Therefore, a desired gain behavior may be enforced on the training of the PUNDA model in precisely the same way that a desired dynamic behavior is enforced.

Figure 4A:
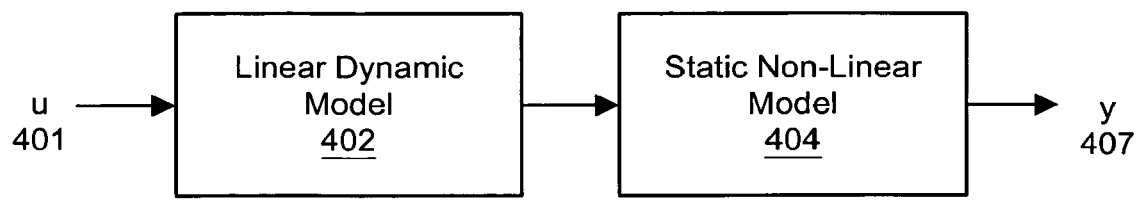
FIGS. 4A and 4B illustrate Weiner and Hammerstein model structures, according to the prior art.
Figure 4B:
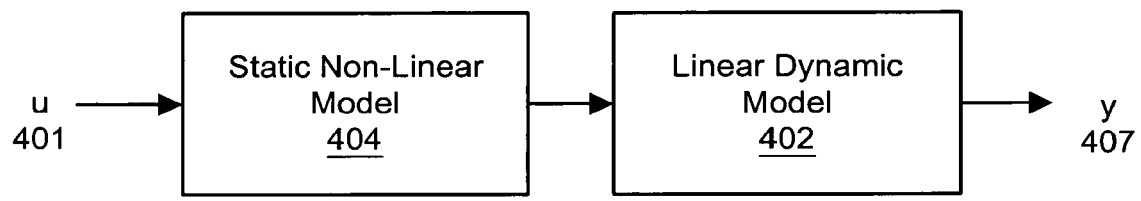

Therefore, the PUNDA model disclosed here departs greatly from the classical notions of Wiener and Hammerstein models for describing nonlinear dynamic systems where the behavior of the nonlinear dynamic system is conceptually decomposed into a linear dynamic system in series with a static nonlinear system (see FIGS. 4A and 4B, described above). As described above, in a PUNDA model, the nonlinear approximator block 502 determines and provides the parameters of the dynamic parameterized model 504, e.g., the MIMO difference equations block, and therefore the input/output relationship in the PUNDA model does not pre-impose the conceptual decomposition inherent in the Wiener and Hammerstein model architectures or structures (for further information related to Weiner and Hammerstein models, please see M. Henson and D. Seborg, Nonlinear Process Control, Prentice Hall, 1997). It should be noted, however, that the Wiener and Hammerstein models may be derived from the PUNDA model as special cases if certain simplifications are applied to the PUNDA model.

Turning now to FIG. 5B, a simplified block diagram of the PUNDA model of FIG. 5A is illustrated as part of an industrial prediction/control system. As FIG. 5B shows, controller 512 receives process outputs 503 from the physical process 104 and provides controller output 515 to a distributed control system (DCS) 516. Note that the controller 512 preferably includes an optimizer 514 that receives, and operates according to, optimizer constraints 513, as is well known in the art. As FIG. 5B also shows, the controller 512 also includes or couples to PUNDA model 506. The optimizer 514 provides trial model inputs 508 (e.g., MVs) to the PUNDA model 506, and the PUNDA model 506 provides resulting PUNDA model output 507 (e.g., CVs) back to the optimizer 514. As is well known in the art of optimization, the optimizer 506 and PUNDA model 506 operate in an iterative manner to generate an optimal set of MVs as controller output 515. In other words, in a preferred embodiment, the controller output 515 is the final iterate of the trial model input 508.

The DCS 516 operates to receive the controller output 515, and provide process inputs 501 to both the physical process 104 and the controller 512, as shown. As is well known, the process inputs 501 may be used to control the operation of the physical process 104, and may also be used by the controller 512, e.g., for control optimization and/or adaptive training of the PUNDA model 506. As is also well known, the DCS 516 may operate to filter or otherwise provide checks or other processing regarding the controller output 515, e.g., for safety purposes. Of course, other components, such as pre- or post-processors may also be included as desired, such as, for example, between the process 104 and the controller 512, e.g., for processing the process output data 503, etc.

The (trained) PUNDA model 506 may thus operate to control the process 104 in an adaptive or dynamic manner. Further details regarding the PUNDA model and its training and use are provided below.

Multi-Input Multi-Output Parametric Difference Equations

As is well known in the art, FP or fundamental models are generally implemented as a set of partial differential equations. Standard methods for translating a differential equation into a difference equation model are well established (see, for example, R. Middleton and G. Goodwin, Digital Control and Estimation: A Unified Approach. Prentice Hall, 1990.) Therefore, the approach disclosed herein may also be applied to systems described in continuous time domain using the following general description:

$$\dot{x}(t) = F_t(u(t), x(t), p(t))$$

$$y(t) = G_t(u(t), x(t), p(t)) \quad (1)$$

Representing the system of Eq. (1) in terms of a discrete time or difference formulation gives:

$$x_k = F_k(u_k, x_{k-1}, p_k)$$

$$y_k = G_k(u_k, x_{k-1}, p_k) \quad (2)$$

where $x_k \in \Re^{N_x \times 1}$ is the state vector, $u_k \in \Re^{N_u \times 1}$ is the input vector, $y_k \in \Re^{N_y \times 1}$ is the output vector, and $p_k \in \Re^{N_p \times 1}$ is the parameter vector at time k. Note that for clarity of the derivation, $x_k$ and $y_k$ are defined as explicit functions of state/input/parameters. Assuming that the system is initially at ($x^{ic}$, $u^{ic}$, $y^{ic}$, $p^{ic}$), the state and the output of the system can be universally approximated by:

$$x_k = x^{ic} + \sum_{i=1}^{I_{xx}} \alpha_{x,i}(\delta x_{k-1})^i + \sum_{i=1}^{I_{xu}} \beta_{x,i}(\delta u_k)^i + \\ \sum_{i=1}^{I_{xp}} \gamma_{x,i}(\delta p_k)^i + \varsigma_{x,xu}(\delta x_{k-1})(\delta u_k) + \varsigma_{x,ux}(\delta u_k)(\delta x_{k-1}) + \\ \varsigma_{x,xp}(\delta x_{k-1})(\delta p_k) + \varsigma_{x,px}(\delta p_k)(\delta x_{k-1}) + \\ \varsigma_{x,up}(\delta u_k)(\delta p_k) + \varsigma_{x,pu}(\delta p_k)(\delta u_k) + H.O.C.T. \\ y_k = y^{ic} + \sum_{i=1}^{I_{yx}} \alpha_{y,i}(\delta x_{k-1})^i + \sum_{i=1}^{I_{yu}} \beta_{y,i}(\delta u_k)^i + \sum_{i=1}^{I_{yp}} \gamma_{y,i}(\delta p_k)^i + \\ \varsigma_{y,xu}(\delta x_{k-1})(\delta u_k) + \varsigma_{y,ux}(\delta u_k)(\delta x_{k-1}) + \varsigma_{y,xp}(\delta x_{k-1})(\delta p_k) + \\ \varsigma_{y,px}(\delta p_x)(\delta x_{k-1}) + \varsigma_{y,up}(\delta u_k)(\delta p_k) + \varsigma_{y,pu}(\delta p_k)(\delta u_k) + H.O.C.T. \quad (3)$$

where parameter matrices, $\alpha_{x,i}, \ldots, \gamma_{x,i}, \zeta_{x,xu}, \ldots, \zeta_{y,pu}$, indicate or highlight the parametric nature of the difference equations describing the evolution of the state and output vectors of the nonlinear system under a transition, and where H.O.C.T. stands for "higher order coupling terms" of the Taylor series expansion. Note that model form of Eqs. (3) may be used to model or approximate phenomena, e.g., as represented by Eq. (2), of any order, and to any accuracy desired, in that the order of the difference equations may be specified, and the higher order coupling terms included as desired. The universal approximation property of the model of Eq. (3) may be proven by simply setting the coefficients in Eq. (3) to the values of the coefficients in a Taylor series expansion of Eq. (2), as is well known in the art.

A special case of importance is when the state vector in Eqs. (2) or (3) can be constructed as an explicit function of current and past inputs/outputs. In this case the MIMO difference equation block may be modeled as a function of inputs/outputs (present and past) only, which is extremely efficient for online optimization/control. This special case includes systems where the evolution of the state is linear, i.e. $F_k$ in Eq. (2) is a linear vector function. M. Phan, R. Lim, and R. Longman, "Unifying input-output and state-space perspectives of predictive control," tech. rep., Dept. of Mech. & Aero. Eng., Princeton University, 1998, show that for a linear vector function $F_k$ in Eq. (2), if the system is observable, an appropriate number of past inputs/outputs are enough to construct the state vector completely. Therefore, the output y at any given time in the future can be expressed solely as a function of past inputs/outputs and current and future inputs. For example, under linear state and output equations in Eq. (3), the MIMO difference equation block can be replaced with:

$$y_k = y^{init} + \left(\sum_{i=1}^{Y_{past}} A_i \delta y_{k-i}\right)^i + \sum_{i=1}^{U_{past}} B_i \delta u_{k-i} \quad (4)$$

where $Y_{past}$ and $U_{past}$ are the number of past outputs and inputs required to fully construct the state vector, and $A_i$ and $B_i$ are the coefficient matrices of appropriate dimension. The bias term $y^{init}$ is introduced as a parameter that encompasses both $y^{ic}$ and the contribution from parameter perturbation (e.g., $\gamma_{x,1}$ ($\delta p_k$)) in the state update and $\gamma_{y,1}$ ($\delta p_k$) in the output update in Eq. (3)). Note that $y^{init}$, $A_i$, and $B_i$ are varying parameters that are the outputs of the nonlinear approximator block (e.g., neural network) 502 in FIG. 5A. The mathematical foundation for the training of such models is described below, as is a generally applicable methodology for constructing the constraint set for the training of the nonlinear approximator model 502 in the case of a neural network.

It is contemplated that in most if not all cases, even a low order expansion in Eq. (4), i.e. $I_{xx} = \ldots = I_{yp} \leq n$ with n small, and higher order coupling or cross terms dropped, is an appropriate parametric model for representing complex nonlinear system if the coefficients $\alpha_{x,1}, \beta_{x,1}, \gamma_{x,1}, \alpha_{y,1}, \beta_{y,1}, \gamma_{y,1}, \zeta_{x,xu}, \ldots \zeta_{y,up}$, and $\zeta_{y,pu}$ are outputs of a nonlinear model, such as a neural network, trained under the combined model structure depicted in FIG. 5A. The main advantage of a low order model is that it is computationally efficient for online optimization and control.

The parametric nature of the model facilitates easier maintenance of the models in that the deterioration of the model can be traced back to parameters, and online constrained training could be used to reduce parameter errors. It is noted that for $n \leq 2$, these parameters may be related to physically meaningful properties of the dynamic system such as gain, damping factors, time constants, etc., hence further facilitating the maintenance of the model by operation personnel.

Problem Formulation for the Training of the Nonlinear Model

In one embodiment, the training of the nonlinear approximator block 502 in the PUNDA model (see FIG. 5A) may be formulated as a constrained nonlinear optimization problem for a simple feedforward neural network with linear input and output layers and a single hidden layer with a sigmoidal activation function. However, as noted earlier, the derivation described below applies for any nonlinear approximator used in the systems of FIGS. 5A and 5B. Examples of alternate nonlinear approximators include, but are not limited to, a nonlinear approximator with a different activation function (e.g., an n-th order integral of the sigmoid function, with $n \geq 1$), or different topology (e.g. a different number of nodes, layers, and/or connectivity).

Figure 6:
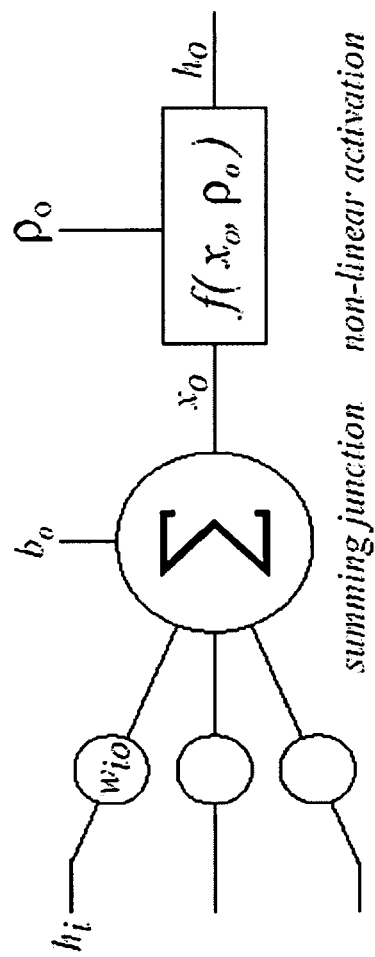
FIG. 6 illustrates a node in a nonlinear approximator network, according to one embodiment.

A node in the general nonlinear approximator block 502 may be represented by the block diagram shown in FIG. 6. This basic building block may appear at any position in the nonlinear approximator network. Note that this embodiment, $x_o$ is an affine function of the inputs $h_i$ to the block, and $f(x_o, \rho_o)$ is a potentially parametric nonlinear mapping from $x_o$ to the output of the node, $h_o$. The feedforward neural network (with linear input and output layers, and a single hidden layer) for which the expository derivations are presented herein is one of the most commonly adopted nonlinear approximators to date. For the $k^{th}$ output unit of this neural network, the output of the node is the output of the nonlinear approximator model. For consistency of the notation with that used in FIG. 5A, the output of the $k^{th}$ output unit is denoted as $P_k$. In this embodiment, it is also assumed that the activation function for this output unit is an identity function, i.e., $f(x_k, \rho_k) = x_k$. The $k^{th}$ output unit may be described as:

$$P_k = x_k$$

$$x_k = \Sigma_j (w_{jk} h_j) + b_k \quad (5)$$

where $h_j$ is the output of the $j^{th}$ hidden unit, $w_{jk}$ is the weight from the $j^{th}$ hidden unit to the $k^{th}$ output unit, and $b_k$ is the bias term for the summation at the $k^{th}$ output unit. Utilizing the same fundamental building block of FIG. 6 for the hidden units of the single hidden layer, the output of the $j^{th}$ hidden unit, $h_j$, may be described as:

$$h_j = f(x_j, \rho_j)$$

$$x_j = \Sigma_i (w_{ij} u_i) + b_j \quad (6)$$

where $x_j$ is the input to the nonlinear activation function in the $j^{th}$ hidden unit, $w_{ij}$ is the weight from input $u_i$ to the $j^{th}$ hidden unit, $b_j$ is the bias of the $j^{th}$ hidden unit, and $f(x_j, \rho_j)$ is a nonlinear (potentially parametric with parameter vector $\rho_j$) activation function. Acceptable activation function include, but are not limited to, sigmoidal ("s-shaped") functions such as $$f(x_j) = \frac{1}{1 + e^{-x_j}},$$

which ranges from 0 to 1, or $f(x_j) = \tan h(x_j)$, which ranges from $-1$ to 1. Note that the input layer in this simplified example is assumed as an identity unit and hence the inputs to the hidden unit are the inputs to the neural network. In general, however, the input layer may admit the structure of FIG. 6, and/or the neural network may include additional inputs that are obtained by applying various signal processing operations to the inputs of the overall PUNDA model (e.g., tap delayed samples of an input, or linearly filtered versions of the input).

A constrained optimization problem for the training of the expository nonlinear approximator block described earlier may be stated in the following form:

$$\min_{\Phi} \sum_d \sum_k (t_{kd} - y_{kd})^2 \quad (7)$$

such that $$L_{md} \leq G_m\left(\Phi, u_d, y_d, \frac{\partial y_{kd}}{\partial y_{id}}, \frac{\partial^2 y_{kd}}{\partial u_{kd} \partial u_{id}}, \ldots \right) \leq U_{md}$$

where the decision vector includes the parameter approximator network's weights and the biases, as well as any potential parameter in the MIMO difference equation block that is not designated as an output of the parameter approximation block. Note that d indexes the dataset, which in some embodiments may include synthetic data points, used for example in extrapolation training, $t_{kd}$ is the target output for the PUNDA model, and $y_{kd}$ is the predicted output of the combined model that is computed using the architecture of the PUNDA model depicted in FIG. 5A. Also note that the sum-squared-error objective is minimized while simultaneously satisfying a set of constraints that may include constraints at each datapoint in the dataset or constraints over the entire input range. Other objective functions, including but not limited to, the log of the absolute error may be used as appropriate.

Constraints used during training may include, but are not limited to, functions of any or all of the following: the parameter approximator inputs, the parameter approximator outputs, the parameter approximator parameters (e.g. weights and biases), the PUNDA model inputs and/or outputs, and any number of derivatives of any order of the PUNDA model outputs with respect to the PUNDA model inputs.

A Preferred Methodology for Imposing Constraints

Successful training of the nonlinear model (e.g., neural network) in the combined PUNDA model may require that certain constraints be satisfied globally (independent from the available data for the training of the model). In some cases it may be beneficial to replace the exact constraints with appropriately constructed upper/lower bounds. Interval arithmetic is described below in a preferred methodology for the derivation of such bounds under arbitrary order of the dynamic parameterized model 504, e.g., MIMO difference equation block, and arbitrary architecture of the nonlinear approximator block 502, e.g., the neural network block.

Given the range of the applications in which the disclosed parametric universal nonlinear dynamics approximator may be deployed, it is crucial to develop a methodology by which the constraints may be imposed and additionally verified at any node in the parameter approximator block in the PUNDA model of FIG. 5A. Interval arithmetic may be used to develop a preferred methodology for systematically computing such constraints. The methodology disclosed herein permits the computation of guaranteed interval bounds on a composite function without having to derive these bounds explicitly for every composite model form that that function may represent. It is in general considered practically impossible to develop a generally applicable software tool for the modeling of complex nonlinear dynamical systems without a generally applicable constraining methodology, given the diversity of the applications for which such models must be developed. The approach to constraint determination disclosed herein may be applied systematically to any input-output model which can be represented as a flow-graph of other more elementary calculations, including both cyclic and acyclic graphs. Potential applications of the techniques described herein include, but are not limited to, process industry, food, pulp and paper, power generation, biological systems, and financial systems, among others. For more detailed information regarding interval analysis and arithmetic, please see R. Moore, *Interval Analysis*. Prentice Hall, 1966.

Interval Arithmetic

Interval arithmetic is an established numerical computation technique in which the evaluation of numerical values is replaced by the evaluation of equivalent numerical ranges. Interval analysis has broad application to problems for which it is necessary to understand how errors, uncertainties, or predefined ranges of parameters propagate through a set of numerical calculations; for example, see R. Hammer, M. Hocks, U. Kulisch, and D. Ratz, C++ *Toolbox for Verified Computing*, Springer-Verlag, 1995.

In one embodiment of the present invention, interval arithmetic is used to compute global bounds on model properties used within a model training formulation. These properties include, but are not limited to: output values, input-output gains, and higher-order input-output derivatives.

In an interval arithmetic framework, each real-valued x is replaced by an equivalent real valued interval $[\underline{x},\overline{x}]=\{x\in\Re \underline{x}\leq x\leq \overline{x}\}$ represented by the short-hand notation $[x]$.

The notation $\underline{x}$ refers to the minimum value of x over the interval and $\overline{x}$ refers to the maximum value of x over the interval.

Given any multi-dimensional function $z=f(x, y, \ldots)$, the interval equivalent $[z]=f([x], [y], \ldots)$ is sought, specifically, the minimum and maximum values that the function can assume given any tuple of values $\{x\in[x], y\in[y], \ldots\}$ within the specified domain. If the function is monotonic, these extremal values are found at the end points of the function. For example, if the function is monotonically increasing in each dimension, $f([\underline{x},\overline{x}])=[f(\underline{x}, \underline{y}, \ldots), f(\overline{x}, \overline{y}, \ldots)]$. In general, the extremal values may occur anywhere in the interval and the exact interval cannot necessarily be inferred from samples of the original function.

Consider the interval equivalent of the four basic binary arithmetic operators $°\in\{+,-,\times,\div\}$. The interval equivalent of each of these operators is:

$$[x]+[y]=[\underline{x}+\underline{y},\overline{x}+\overline{y}]$$

$$[x]-[y]=[\underline{x}-\overline{y},\overline{x}-\underline{y}]$$

$$[x]\times[y]=[\min\{\underline{xy},\underline{x}\overline{y},\overline{x}\underline{y},\overline{xy}\},\max\{\underline{xy},\underline{x}\overline{y},\overline{x}\underline{y},\overline{xy}\}]$$

$$[x]\div[y]=[x]\times[1/\overline{y},1/\underline{y}], 0\notin[y] \qquad (8)$$

Scaling and biasing by a constant as well as change of sign are specializations of these rules:

$$-[x] = [-\overline{x}, -\underline{x}] \qquad (9)$$

$$[x] + b = [\underline{x}+b, \overline{x}+b,]$$

$$a\times[x] = \begin{cases} [a\underline{x}, a\overline{x}], & \text{if } a \geq 0 \\ [a\overline{x}, a\underline{x}], & \text{if } a \leq 0 \end{cases}$$

Similar analysis can be repeated for elementary functions such as sin( ) tan( ) exp( ), and so forth.

A key aspect of interval arithmetic is the computation of bounds on any function $f( )$ which is defined by an expression of other elementary operations. This can be accomplished by replacing each elementary operation in the expression with its interval equivalent. The resulting interval function is called an interval extension of $f(.)$, and is denoted by $f_{[\,]}([.])$, which has the property $$x\in[x], y\in[y], \ldots \Rightarrow f(x,y,\ldots)\in f_{[\,]}([x],[y],\ldots) \qquad (10)$$

This can be written as a set inclusion $$f([x]) \subseteq f_{[\,]}([x]).$$

While the bounds of the interval extension are not exact, they are guaranteed to contain the actual interval. The degree of over-bounding of the interval extension is dependent on the form of the expression which defines $f( )$.

Interval Arithmetic for Models

A primary benefit of using interval extension is that it provides a computational mechanism for computing "auto bounds." In other words, it permits the computation of guaranteed interval bounds on a composite function without having to derive these bounds explicitly for every composite form. As noted above, this idea may be applied systematically to any input-output model that can be represented as a flow-graph of other more elementary calculations, including both cyclic and acyclic graphs.

Figure 7A:
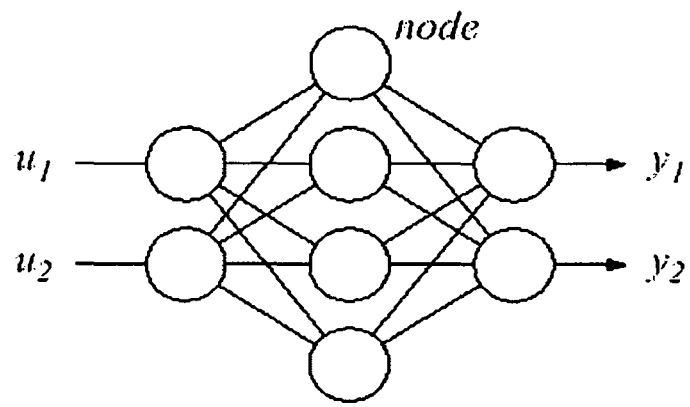
FIG. 7A illustrates an exemplary neural network, according to one embodiment.
Figure 7B:
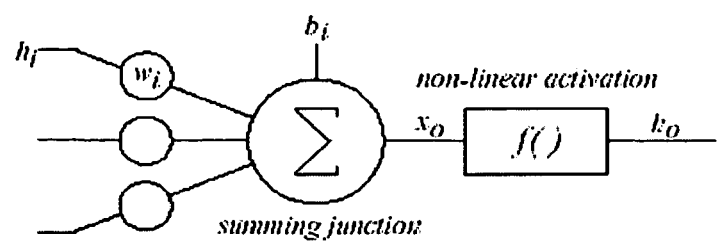
FIG. 7B illustrates an exemplary node in the neural network of FIG. 7A, according to one embodiment.

For example, in one embodiment, the PUNDA model 506 shown in FIG. 5A may be composed of a neural-network (the nonlinear approximator 502) and a set of MIMO difference equations (the dynamic parameterized model 504). Each of these components may in turn be composed of other elementary operations. An interval extension of the model relationships can then be defined by systematic substitution of interval operations. As a simple example, consider the simple neural network structure shown in FIG. 7A, although it should be noted that the neural network of FIG. 7A is exemplary only, and is not intended to denote an actual neural network. The equations that define the numerical calculations associated with a single node, illustrated in FIG. 7B, are:

$$x_o = \sum_{i=1}^{N} w_i h_i + b \quad (11)$$

$$h_o = f(x_o)$$

The interval extension of the summing junctions calculations can be summarized as follows:

$$[\underline{x_o}, \overline{x_o}] = \left[\sum_{i=1}^{N} w_i h_i + b\right] \quad (12)$$

$$\underline{x_o} = \begin{cases} [w_1 \underline{h_1}], & \text{if } w_1 \geq 0 \\ [w_1 \overline{h_1}], & \text{if } w_1 \leq 0 \end{cases} + \ldots + \begin{cases} [w_N \underline{h_N}], & \text{if } w_N \geq 0 \\ [w_N \overline{h_N}], & \text{if } w_N \leq 0 \end{cases} + b$$

$$\overline{x_o} = \begin{cases} [w_1 \overline{h_1}], & \text{if } w_1 \geq 0 \\ [w_1 \underline{h_1}], & \text{if } w_1 \leq 0 \end{cases} + \ldots + \begin{cases} [w_N \overline{h_N}], & \text{if } w_N \geq 0 \\ [w_N \underline{h_N}], & \text{if } w_N \leq 0 \end{cases} + b$$

In this example, it is assumed that the weight $w_i$ and bias $b$ parameters are constant values, not intervals. Assuming that the non-linear activation function is monotonically increasing, the interval extension may be computed as:

$$[\underline{h_o}, \overline{h_o}] = f_{[\,]}([\underline{x_o}, \overline{x_o}])$$

$$\underline{h_o} = f(\underline{x_o})$$

$$\overline{h_o} = f(\overline{x_o}) \quad (13)$$

These interval expressions can be composed such that the output interval $[\underline{h_o}, \overline{h_o}]$ of one node can be used as the input interval $[\underline{h_i}, \overline{h_i}]$ for a subsequent node in the flow-graph. A similar derivation can be performed for a simple difference equation, as follows:

$$y_k = \sum_{i=1}^{N_y} A_i y_{k-i} + \sum_{i=0}^{N_u} B_i u_{k-i}$$

$$= A_1 y_{k-1} + A_2 y_{k-2} + \ldots + B_0 u_k + B_1 u_{k-1} + \ldots$$

This is a simplification of equations that in some embodiments may appear in the dynamic parameterized model block 504, e.g., the MIMO block 504, of the PUNDA model 506. In describing the interval extension of this recurrent equation, it is assumed that the parametric values $A_i$ and $B_i$ are not constants. Rather, they are also intervals. This allows correct composition of this model with the previously described neural network structure.

$$[\underline{y_k}, \overline{y_k}] = [\underline{A_1}, \overline{A_1}][\underline{y_{k-1}}, \overline{y_{k-1}}] + [\underline{A_2}, \overline{A_2}][\underline{y_{k-2}}, \overline{y_{k-2}}] + \ldots + [\underline{B_0}, \quad (14)$$

$$\overline{B_0}][\underline{u_k}, \overline{u_k}] + [\underline{B_1}, \overline{B_1}][\underline{u_{k-1}}, \overline{u_{k-1}}] + \ldots$$

-continued $$\underline{y_k} = \min\{\underline{A_1} \underline{y_{k-1}}, \underline{A_1} \overline{y_{k-1}}, \overline{A_1} \underline{y_{k-1}}, \overline{A_1} \overline{y_{k-1}}\} +$$

$$\min\{\underline{A_2} \underline{y_{k-2}}, \underline{A_2} \overline{y_{k-2}}, \overline{A_2} \underline{y_{k-2}}, \overline{A_2} \overline{y_{k-2}}\} + \ldots +$$

$$\min\{\underline{B_0} \underline{u_k}, \underline{B_0} \overline{u_k}, \overline{B_0} \underline{u_k}, \overline{B_0} \overline{u_k}\} +$$

$$\min\{\underline{B_1} \underline{u_{k-1}}, \underline{B_1} \overline{u_{k-1}}, \overline{B_1} \underline{u_{k-1}}, \overline{B_1} \overline{u_{k-1}}\} + \ldots$$

$$\overline{y_k} = \max\{\underline{A_1} \underline{y_{k-1}}, \underline{A_1} \overline{y_{k-1}}, \overline{A_1} \underline{y_{k-1}}, \overline{A_1} \overline{y_{k-1}}\} +$$

$$\max\{\underline{A_2} \underline{y_{k-2}}, \underline{A_2} \overline{y_{k-2}}, \overline{A_2} \underline{y_{k-2}}, \overline{A_2} \overline{y_{k-2}}\} + \ldots +$$

$$\max\{\underline{B_0} \underline{u_k}, \underline{B_0} \overline{u_k}, \overline{B_0} \underline{u_k}, \overline{B_0} \overline{u_k}\} +$$

$$\max\{\underline{B_1} \underline{u_{k-1}}, \underline{B_1} \overline{u_{k-1}}, \overline{B_1} \underline{u_{k-1}}, \overline{B_1} \overline{u_{k-1}}\} + \ldots$$

Auto Differentiation and Interval Arithmetic

In addition to computing functional bounds on a model, interval arithmetic may be used to compute bounds on input/output gains as well. This may be accomplished by combining interval arithmetic with auto-differentiation techniques (again, for more information, please see R. Hammer, M. Hocks, U. Kulisch, and D. Ratz, C++ Toolbox for Verified Computing, Springer-Verlag, 1995.) Auto-differentiation is an application of the chain-rule that allows the derivative of a complex function to be decomposed into a sequence of elementary derivative operations. Consider, for example, the exemplary neural network illustrated in FIG. 7A. In order to compute the gain term $dy_1/du_2$, the following procedure may be performed: Let the variable $\theta$ be the input value with respect to which the output derivative is taken. Initialize the boundary condition correspondingly:

$$\frac{du_i}{d\theta} = \begin{cases} 1 & \text{if } i = 2 \\ 0 & \text{if } i \neq 2 \end{cases} \quad (15)$$

Then perform the following set of chain-rule operations for each node in sequential order in conjunction with the normal evaluations:

$$\frac{dx_o}{d\theta} = \sum_{i=1}^{N} w_i \frac{dh_i}{d\theta} \quad (16)$$

$$\frac{dh_o}{d\theta} = \frac{df(x_o)}{dx_o} \frac{dx_o}{d\theta}$$

Finally, note that the propagated output quantity $dy_1/d\theta$ is, by construction, the desired gain element $dy_1/du_2$.

Thus, the computation of any input-output gain term may be reduced to a flow-graph operation. As such, the previously described interval extension techniques may be applied, and bounds of these gains computed for inclusion in a training problem. First, for the previous example the input boundary conditions may be augmented thus:

$$\left[\frac{du_i}{d\theta}\right] = \begin{cases} [1, 1] & \text{if } i = 2 \\ [0, 0] & \text{if } i \neq 2 \end{cases} \quad (17)$$

and apply interval extension to the recursive gain operations, resulting in:

$$\left[\frac{dx_o}{d\theta}\right] = \left[\sum_{i=1}^{N} w_i \frac{dh_i}{d\theta}\right] \frac{dx_o}{d\theta} =$$

$$\frac{dx_o}{d\theta} = \begin{cases} \left[w_1 \frac{dh_1}{d\theta}\right] & \text{if } w_1 \geq 0 \\ \left[w_1 \frac{\overline{dh_1}}{d\theta}\right] & \text{if } w_1 \leq 0 \end{cases} + \ldots + \begin{cases} \left[w_N \frac{dh_N}{d\theta}\right] & \text{if } w_N \geq 0 \\ \left[w_N \frac{\overline{dh_N}}{d\theta}\right] & \text{if } w_N \leq 0 \end{cases}$$

$$\frac{\overline{dx_o}}{d\theta} = \begin{cases} \left[w_1 \frac{\overline{dh_1}}{d\theta}\right] & \text{if } w_1 \geq 0 \\ \left[w_1 \frac{dh_1}{d\theta}\right] & \text{if } w_1 \leq 0 \end{cases} + \ldots + \begin{cases} \left[w_N \frac{\overline{dh_N}}{d\theta}\right] & \text{if } w_N \geq 0 \\ \left[w_N \frac{dh_N}{d\theta}\right] & \text{if } w_N \leq 0 \end{cases}$$

Note that $$\left[\frac{df(x_o)}{dx_o}\right]$$

represents the interval of possible first derivatives of the activation function over all possible input values u. This range may be computed during the forward pass using interval arithmetic techniques starting from a global range of input values $[\underline{x}_o, \overline{x}_o]$ that is pre-selected to be some infinite or finite range of the input space.

It follows that:

$$\frac{dh_o}{d\theta} = \min\left\{\frac{df(x_o)}{dx_o}\frac{dx_o}{d\theta}, \frac{df(x_o)}{dx_o}\frac{\overline{dx_o}}{d\theta}, \frac{\overline{df(x_o)}}{dx_o}\frac{dx_o}{d\theta}, \frac{\overline{df(x_o)}}{dx_o}\frac{\overline{dx_o}}{d\theta}\right\} \quad (19)$$

$$\frac{\overline{dh_o}}{d\theta} = \min\left\{\frac{df(x_o)}{dx_o}\frac{dx_o}{d\theta}, \frac{df(x_o)}{dx_o}\frac{\overline{dx_o}}{d\theta}, \frac{\overline{df(x_o)}}{dx_o}\frac{dx_o}{d\theta}, \frac{\overline{df(x_o)}}{dx_o}\frac{\overline{dx_o}}{d\theta}\right\}$$

Again, the output values may be interpreted as estimates of the overall gain bounds:

$$\left[\frac{dy_1}{d\theta}, \frac{\overline{dy_1}}{d\theta}\right]$$

which are guaranteed to contain the actual gains over the selected input space $[\underline{x}_o, \overline{x}_o]$ by virtue of the following guaranteed inequality:

$$\frac{dy_1}{d\theta} \leq \frac{dy_1}{du_2}\bigg|_{x\in[\underline{x}_o, \overline{x}_o]} \leq \frac{\overline{dy_1}}{d\theta} \quad (20)$$

To ensure that the actual model gains comply with the operational constraint [L, U] at all required input values, we need to ensure that the following inequality:

$$L \leq \frac{dy_1}{du_2}\bigg|_{x\in[\underline{x}_o, \overline{x}_o]} \leq U \quad (21)$$

is satisfied for all required values of x. To accomplish this, it is sufficient to make sure that the gain bound estimates are within the range of the operational constraints, [L,U]:

$$L \leq \frac{dy_1}{d\theta} \leq \frac{\overline{dy_1}}{d\theta} \leq U \quad (22)$$

While satisfaction of the inequality in Eq. (22) will ensure that the actual gains of the model comply with the desired operational constraints, the overestimation inherent in Eq. (20) may result in the actual gains being restricted to a narrow subset of [L,U].

Interval Arithmetic and Input-Region Partitioning

Bounds on model outputs or model gains computed using interval arithmetic are, by their nature, conservative bound estimates. Tighter bounds can be computed using verified global optimization techniques. In the above description of using interval arithmetic methods to compute bounds on model outputs and gains, the entire operating region (or suitable super-set of that region) was used as the input interval. This input-interval is, in general, a multi-dimensional hyper-rectangle. Tighter bounds can be achieved by starting with smaller input interval. In the limiting case, a point input region results in the exact computation of the output or gain at that single point-input. This observation gives rise to a nature divide-and-conquer strategy for determining minimum and maximum values for outputs and gains of the model, see R. Hammer, M. Hocks, U. Kulisch, and D. Ratz, C++ *Toolbox for Verified Computing*, Springer-Verlag, 1995 and E. Hansen, *Global Optimization Using Interval Analysis*. Marcel Dekker, Inc. New York, 1992. As described later, this technique may be used during model training or, in the preferred embodiment, it can be performed as part of a post-training verification step.

We describe specifically how to search for the minimum value of a model output or gain, denoted as $f$, over a desired global input region and note that only slight modification is needed to search for the maximum value. The search begins with: (1) a single hyper-rectangle representing the global input region and (2) a global upper bound on the minimum value of $f$ denoted as $\hat{f}$. The initial value of $\hat{f}$ may be selected as the minimum of a set of point-evaluations of $f$. The input region is recursively partitioned by selecting an existing hyper-rectangle, repartitioning it along a selected dimension, and replacing it with the two new smaller hyper-rectangles. The interval-based computation of the $[f]$ is performed for the two new hyper-rectangles as described earlier. A hyper-rectangle in the working set can be discarded if $\hat{f} < \underline{f}$ for that hyper-rectangle. In addition, the global lower bound $\check{f}$ may be reduced if a hyper-rectangle is constructed for which $\overline{f} < \hat{f}$, or if a point-evaluation of $f$ results in $f < \hat{f}$. Many heuristics have been described in the literature for tuning the performance of this basic branch-and-bound search strategy. See for example R. Patil, *Efficient Verified Global Optimization Using Interval Arithmetic*, Dissertation for Degree of Doctor of Philosophy, New Mexico State University, 1996.

Figure 8:
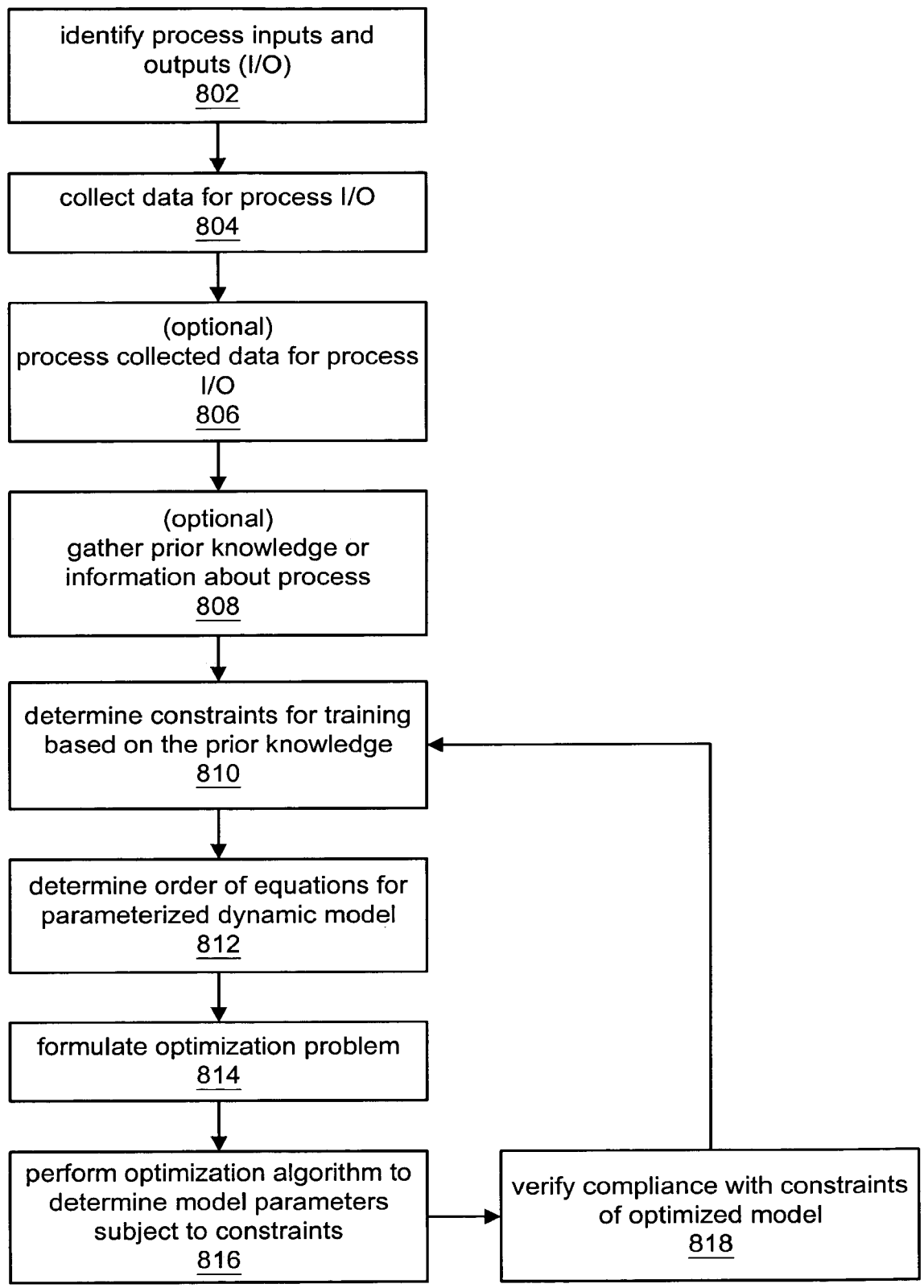
FIG. 8 flowcharts one embodiment of a method for training a model, according to one embodiment of the present invention.

FIG. 8—Training a Model of a Nonlinear Process

FIG. 8 is a high level flowchart of a method for training a model of a nonlinear process, such as the PUNDA model described herein, according to one embodiment. It should be noted, however, that various embodiments of the training method described may be applied to training other types of nonlinear models as well. It should also be noted that in various embodiments, some of the method elements described may be performed concurrently, in a different order than shown, or omitted. Additional method elements may also be performed as desired. The method below is described for an embodiment of the PUNDA model using a neural network and a set of MIMO difference equations, although it should be noted that the method is broadly applicable to other types of PUNDA models, and to other types of nonlinear models in general.

As FIG. 8 shows, in 802, process inputs/outputs (I/O), i.e., I/O parameters, to be included in the model may be identified. Examples of I/O parameters may include material inputs and outputs, conditions, such as temperature and pressure, power, costs, and so forth. This identification of process I/O may be accomplished in a variety of different ways. For example, in one embodiment, expert knowledge may be used to determine or otherwise identify the process inputs and outputs. As another example, in one embodiment, the process I/O may be determined or identified programmatically through systematic search algorithms, such as correlation analysis. Other approaches or techniques for identifying the process inputs and outputs are also contemplated.

In 804, data for the process input(s)/output(s) may be collected. For example, the data may be historical data available from plant normal operation, e.g., from plant operation logs, and/or test data. Alternatively, in some embodiments, all or part of the data may be generated from other models, assembled or averaged from multiple sources, etc. In yet another embodiment, the data may be collected substantially in real time from an operating process, e.g., from an online source.

In 806, one or more signal processing operations may optionally be performed on the data. For example, the signal processing operations may include filtering the data to reduce noise contamination in the data, removing outlier data from the data set (i.e., anomalous data points), data compression, variable transformation, and normalization, among others. Thus, the collected data from 804 may be preprocessed or otherwise manipulated to put the data into a form suitable for use in training the model.

In 808, prior knowledge about the process may optionally be assembled or gathered. For example, the prior knowledge may include operator knowledge regarding the sign of a particular gain, or a residence time in the system. As another example, the prior knowledge may include more systematic information, such as, for example, a partial or complete first principles model of the process, e.g., in the form of a set of nonlinear differential or partial differential equations. Well known methodologies exist to determine or extract constraints, such as derivatives of the outputs with respect to inputs (commonly referred to as gains), from first principles models or information.

In 810, the prior knowledge of 808 may be processed to determine or create the constraints for the training problem. For example, commercially available software may be used to derive analytical expressions for the first or higher order derivatives of the outputs with respect to the inputs, including these derivatives in the constraints. In other embodiments, the processing may also include sophisticated checks on the consistency of the prior knowledge.

In 812, an order for the MIMO difference equations may be determined. In other words, the order of the equations comprised in the parameterized dynamic model 504 may be determined. For example, in one embodiment, the order may be determined by an expert, i.e., one or more human experts, or by an expert system. In another embodiment, the order may be determined as a result of a systematic optimization problem, in which case the determination of the order of the model may be performed simultaneously or concurrently with the training of the model.

In 814, an optimization problem may be formulated in which model parameters are or include decision variables. Equation 7 provides an example of a mathematical programming formulation, where an objective function operates to minimize model errors subject to a set of constraints. This mathematical programming formulation may, in one embodiment, be determined by transforming or recasting the prior knowledge into a mathematical description suitable for a NLP problem. The constraint set may include terms computed on a point-by-point basis over the set of data points. The constraint set may include aggregations of point-by-point constraints. The constraint set may also include data-independent bounds on constraint values, which in the preferred embodiment may be evaluated using interval arithmetic methods over either a single global input region or using input-region partitioning.

In one embodiment, formulating an optimization problem may include determining or modifying the objective function. For example, the objective function may be input by a user, or may be programmatically determined by the optimization process, e.g., based on user specifications or stored criteria. In some embodiments, a pre-existing objective function may be received or retrieved from memory, and may optionally be modified. The objective function may be modified based on user input, and/or programmatically, i.e., automatically by the optimization process.

In 816, optimization algorithms may be executed or performed to determine the parameters (i.e., values of the parameters) of the PUNDA model. Note that in various embodiments, any type of commercially available solver (such as, for example, solvers utilizing sequential quadratic programming or any other techniques) may be used for this purpose. In other embodiments, any of various traditional neural network training algorithms, such as back propagation, may be used as desired and appropriate.

Finally, in 818, satisfaction of the constraint set may be verified and the value of the objective function may be computed. If the constraints are not satisfied, or the objective value is not sufficiently small, the method elements 810, 812, 814, and 816 of formulating and solving the model optimization task may be repeated. This verification may be performed in a number of ways including the use of heuristics or through the application of systematic analysis techniques, among others. For example, in a preferred embodiment, the data-independent gains of the model may be verified using interval arithmetic over the global input region and/or interval arithmetic with input-region partitioning.

Thus, various embodiments of the method of FIG. 8 may be used to train a nonlinear model, such as a PUNDA model, where the training process results in the determination of model parameters and their values over the operational regime of the process. In other words, because the nonlinear approximator (e.g., the neural network) 502 and the parameterized dynamic model (e.g., the MIMO difference equations) 504 are trained together, the parameter values provided by the nonlinear approximator 502 to the parameterized dynamic model 504 may vary during operation of the process, e.g., as conditions or other operational aspects of the process change. This integrated training of the nonlinear approximator 502 and the parameterized dynamic model 504 thus treats the combined model in a holistic manner, i.e., considers the combined model behavior as a global property via the confluence of the entire set of model parameters and their values over the operational regime of the process, and thus the training is not limited to some isolated aspect of the system or process behavior, as is typically the case with prior art systems and methods.

Figure 9:
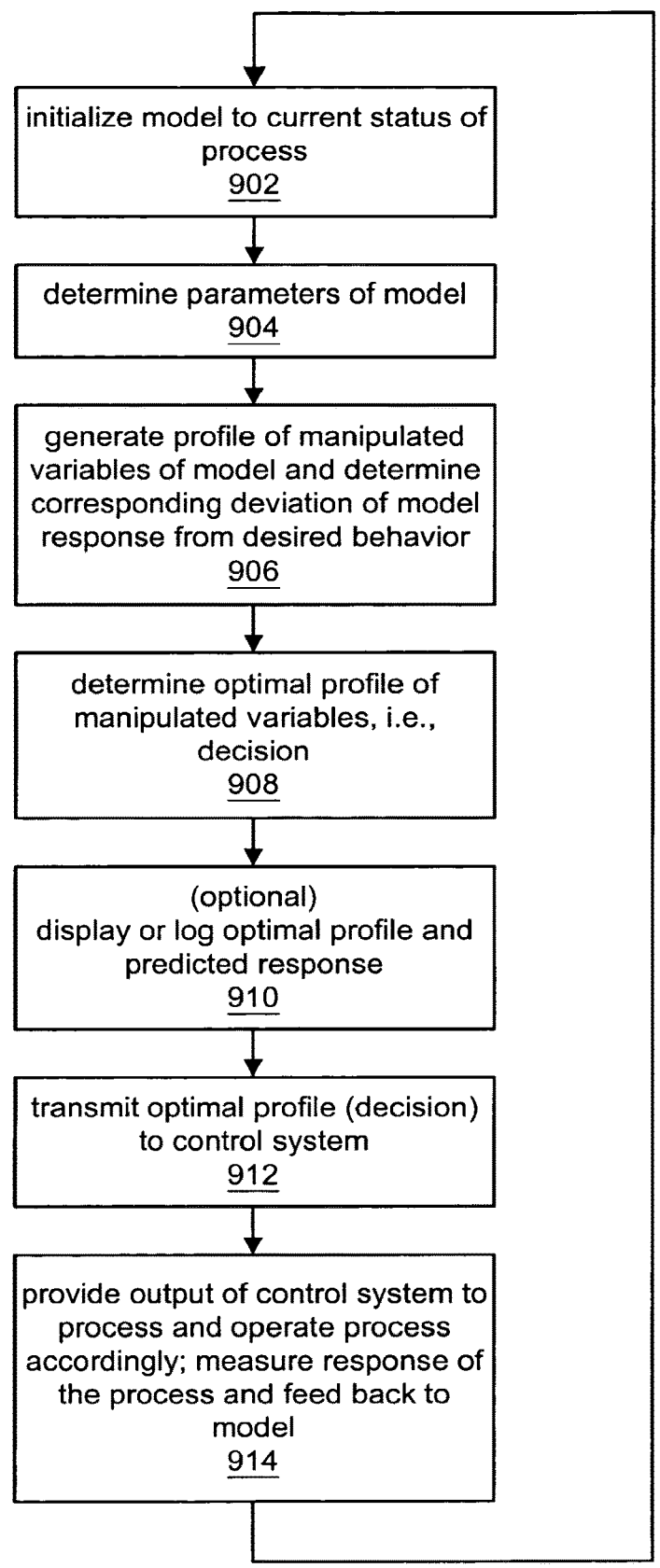
FIG. 9 flowcharts one embodiment of a method for operating a combined model, according to one embodiment of the present invention.

FIG. 9—Operation of the PUNDA Model

FIG. 9 is a high level flowchart of a method of operation of the PUNDA model in a control application for a physical process, e.g., a physical plant, according to one embodiment. Thus, in the embodiment described, the PUNDA model couples to the physical process, and also to a controller which operates to manage or control the process based on outputs from the PUNDA model, as illustrated by FIG. 5B. As mentioned earlier, however, the methods presented herein are also contemplated as being broadly applicable in a wide variety of application domains, including both physical and non-physical (e.g., analytical) processes. As noted above, in various embodiments, some of the method elements described may be performed concurrently, in a different order than shown, or omitted. Additional method elements may also be performed as desired.

In 902, the model may be initialized to a current status of the physical process to be controlled. This initialization may ensure that the PUNDA model and the physical plant are correctly aligned, and thus that the predictions produced by the PUNDA model are relevant to the physical process. In various embodiments, the initialization may be performed by a human expert, and expert system, or via a systematic methodology of identifying the initial conditions of the model given available current and past measurements from the physical process. Other approaches to initialization are also contemplated.

In 904, various attributes or parameters of the combined model and process may be determined or defined, such as, for example, control variable and manipulated variable (CV and MV) target profiles, CV/MV constraint profiles, disturbance variable (DV) profiles, prediction and control horizons, objective function and constraints, and tuning parameters for the controller, among others. In various embodiments, these determinations or definitions may be performed by an operator, programmatically, or a combination of the two. In an embodiment where the determinations are made programmatically, the controller may be a hierarchical controller, where a higher level controller in the control hierarchy decides or determines the desired set points for a lower level controller.

In 906, a profile for the MV moves or changes, i.e., a trajectory of the MV values, over the control horizon may be generated, and the model's response over the prediction horizon may be observed, and the deviation from the desired behavior determined. In one embodiment, the MV profiles may be determined by a human operator, although in a preferred embodiment, the MV profiles may be determined programmatically, e.g., by an optimization algorithm or process. The model response to the presumed MV profile may be calculated over the prediction horizon and compared to the desired behavior and constraints. The appropriateness or suitability of the MV profile may be measured or evaluated by or via corresponding value or values of the objective function. In other words, values of the manipulated variables are provided to the process model (i.e., the PUNDA model), e.g., to control the model, and the resulting behavior observed. This response is then compared to the desired response, e.g., as quantified by the value of the objective function, as is well known in the art of optimization.

Then, in 908, an optimal MV profile may be determined. For example, in a preferred embodiment, method element 906 may be performed iteratively with different MV profiles until a satisfactory predicted system response is obtained. Although this may be performed via trial and error by a human operator, the preferred mode of operation is to use an optimizer to systematically search for the optimal MV profiles, e.g., by systematically seeking those MV moves or changes for which the objective function is improved (e.g. minimized when the objective function reflects the control cost) while respecting constraints. The determined optimal MV profile may be considered or referred to as a decision, and the corresponding model response may be considered or referred to as the predicted response of the process.

In 910, information related to or indicating the MV profiles and corresponding model response (e.g., MV profiles and predicted system response) may optionally be displayed and/or logged, as desired. For example, the MV profiles and system response may be displayed in an appropriate user interface, or logged in a database, e.g., for future diagnosis.

In 912, a portion or the entirety of the decision (MV) profiles may be transmitted to a distributed control system (DCS) to be applied to the physical system. In one embodiment, final checks or additional processing may be performed by the DCS. For example, the DCS may check to make sure that a decision (e.g., a value or set of values of the manipulated variables) does not fall outside a range, e.g., for safety. If the value(s) is/are found to be outside a valid or safe range, the value(s) may be reset, and/or an alert or alarm may be triggered to call attention to the violation.

In 914, the output of the DCS, e.g., the (possibly modified) decision profiles, may be provided as actual input to the physical process, thereby controlling the process behavior, and the input to the physical process (i.e., the output of the DCS) and the actual process response (i.e., the actual process outputs) may be measured. In a preferred embodiment, the information may be fed back to the PUNDA model, where the actual process input/output measurements may be used to improve the estimate of the current status of the process in the model, and to produce a new deviation from the desired system response. In one embodiment, the optimization problem may be modified based on the input to the model. For example, in various embodiments modifying the optimization problem may include modifying one or more of constraints, the objective function, model parameters, optimization parameters, and optimization data, or any other aspect of the optimization process. The method may then return to method element 902 above, and continue as described above, dynamically monitoring and controlling the process in an ongoing manner, where the method attempts to satisfy the objective function subject to the determined or specified constraints.

As noted above, in one embodiment, the input/output of the process may be used to continue training the PUNDA model online. Alternatively, in other embodiments, the model may be decoupled intermittently for further training, or, a copy of the model may be created and trained offline while the original model continues to operate, and the newly trained version substituted for the original at a specified time or under specified conditions.

Thus, various embodiments of the parametric universal nonlinear dynamics approximator, or PUNDA model, described herein may provide a more powerful and flexible model architecture for prediction, optimization, control, and/or simulation applications. Additionally, the interval analysis approach described herein for determining constraints for this and other types of models provides a reliable and computationally tractable method for training such models. In combination, these concepts and techniques may facilitate substantially real time or online operation of prediction, optimization, and/or control systems in any of a wide variety of application domains. Offline modeling, prediction, and/or simulation of nonlinear processes and systems are also facilitated by embodiments of the systems and methods disclosed herein.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A tangible, non-transitory computer readable memory medium storing program instructions for online model predictive control and optimization of a nonlinear physical process, wherein the program instructions are executable by a processor to:
   receive, via an automation controller, during operation of the nonlinear physical process, values for one or more inputs of the nonlinear physical process that are measured directly from the nonlinear physical process during operation of the nonlinear physical process;
   train, via the automation controller, during operation of the nonlinear physical process, a nonlinear approximator simultaneously with a dynamic parameterized model, wherein training comprises:
      generating a mapping between the one or more inputs of the nonlinear process to one or more outputs using the nonlinear approximator;
      generating one or more parameters that characterize a shape of the mapping of the one or more outputs as a function of the one or more inputs using the nonlinear approximator, wherein the mapping is configured to characterize one or more gain relationships between the one or more inputs and the one or more outputs;
   providing, via the automation controller, the one or more parameters of the nonlinear physical process to a dynamic parameterized model that models the nonlinear physical process during operation of the nonlinear physical process; and
   generating one or more predicted process outputs during operation of the nonlinear physical process, wherein the one or more parameters are generated using the nonlinear approximator simultaneously while the one or more predicted process outputs are generated using the dynamic parameterized model; and
   adjust, via the automation controller, during operation of the nonlinear physical process, operating parameters of the nonlinear physical process based on the one or more predicted process outputs that are output from the dynamic parameterized model; and
   dynamically modify the mapping between the one or more inputs based on the values representative of the one or more outputs of the nonlinear physical process that are output from the dynamic parameterized model such that a subsequent training of the nonlinear approximator and the dynamic parameterized model is based on the modified mapping, and wherein a subsequent adjustment of the operating parameters is based on the modified mapping.

2. The tangible, non-transitory computer readable memory medium of claim 1, wherein the nonlinear approximator and the dynamic parameterized model are independently trained substantially concurrently.

3. The tangible, non-transitory computer readable memory medium of claim 1, wherein the program instructions are executable by the processor to determine constraints on model behavior from prior knowledge, to formulate an optimization problem, to execute an optimization algorithm to determine the one or more parameters subject to the determined constraints by solving the optimization problem, and to verify compliance of the dynamic parameterized model with the determined constraints, and wherein the determined constraints comprise one or more constraints for the nonlinear approximator for modeling one or more dependencies of the one or more parameters of the dynamic parameterized model with respect to one or more operating conditions of the nonlinear physical process.

4. The tangible, non-transitory computer readable memory medium of claim 3, wherein the program instructions are executable by the processor to use interval arithmetic over a global input region to verify the compliance of the dynamic parameterized model.

5. The tangible, non-transitory computer readable memory medium of claim 3, wherein the program instructions are executable by the processor to use interval arithmetic with input-region partitioning to verify the compliance of the dynamic parameterized model.

6. The tangible, non-transitory computer readable memory medium of claim 3, wherein the program instructions are executable by the processor to execute the optimization algorithm to determine an optimal order of the dynamic parameterized model, wherein the optimal order specifies the number of the one or more parameters, and wherein the one or more parameters exclude inputs or outputs of the nonlinear process.

7. The tangible, non-transitory computer readable memory medium of claim 6, wherein the program instructions are executable by the processor to determine the optimal order for the dynamic parameterized model and to determine the structure for the nonlinear approximator substantially concurrently.

8. The tangible, non-transitory computer readable memory medium of claim 2, wherein the program instructions are executable by the processor to store the trained nonlinear approximator and the trained dynamic parameterized model as a trained parametric universal nonlinear dynamic approximator.

9. The tangible, non-transitory computer readable memory medium of claim 1, wherein the program instructions include a feedback loop operable to provide output of the nonlinear approximator from a previous cycle as input to the nonlinear approximator for a current cycle.

10. The tangible, non-transitory computer readable memory medium of claim 1, wherein the dynamic parameterized model comprises a multi-input (MIMO) dynamic model implemented with a set of difference equations.

11. The tangible, non-transitory computer readable memory medium of claim 10, wherein the set of difference equations comprises a set of discrete time polynomials.

12. A method for online model predictive control and optimization of a nonlinear physical process, comprising:
   receiving, via an automation controller, during operation of the nonlinear physical process, values for one or more inputs of the nonlinear physical process that are measured directly from the nonlinear physical process during operation of the nonlinear physical process;

training, via the automation controller, during operation of the nonlinear physical process, a nonlinear approximator simultaneously with a dynamic parameterized model, wherein training comprises:

generating a mapping between the one or more inputs of the nonlinear process to one or more outputs using the nonlinear approximator;

generating one or more parameters that characterize a shape of the mapping of the one or more outputs as a function of the one or more inputs using the nonlinear approximator, wherein the mapping is configured to characterize one or more gain relationships between the one or more inputs and the one or more outputs;

providing, via the automation controller, the one or more parameters of the nonlinear physical process to a dynamic parameterized model that models the nonlinear physical process during operation of the nonlinear physical process; and generating one or more predicted process outputs during operation of the nonlinear physical process wherein the one or more parameters are generated using the nonlinear approximator simultaneously while the one or more predicted process outputs are generated using the dynamic parameterized model; and adjusting, via the automation controller, during operation of the nonlinear physical process, operating parameters of the nonlinear physical process based on the one or more predicted process outputs that are output from the dynamic parameterized model; and dynamically modifying the mapping between the one or more inputs based on the values representative of the one or more outputs of the nonlinear physical process that are output from the dynamic parameterized model such that a subsequent training of the nonlinear approximator and the dynamic parameterized model is based on the modified mapping, and wherein a subsequent adjustment of the operating parameters is based on the modified mapping.

13. The method of claim 12, wherein the nonlinear approximator and the dynamic parameterized model are independently trained substantially concurrently.

14. The method of claim 12, comprising determining constraints on model behavior from prior knowledge, formulating an optimization problem, executing an optimization algorithm to determine the one or more parameters subject to the determined constraints by solving the optimization problem, and verifying compliance of the dynamic parameterized model with the determined constraints, and wherein the determined constraints comprise one or more constraints for the nonlinear approximator for modeling one or more dependencies of the one or more parameters of the dynamic parameterized model with respect to one or more operating conditions of the nonlinear physical process.

15. The method of claim 14, comprising using interval arithmetic over a global input region to verify the compliance of the dynamic parameterized model.

16. The method of claim 14, comprising using interval arithmetic with input-region partitioning to verify the compliance of the dynamic parameterized model.

17. The method of claim 14, comprising executing the optimization algorithm to determine an optimal order of the dynamic parameterized model, wherein the optimal order specifies the number of the one or more parameters.

18. The method of claim 17, comprising determining a structure for the nonlinear approximator for modeling dependencies of the one or more parameters based upon operating conditions of the nonlinear physical process.

19. The method of claim 18, comprising determining the optimal order for the dynamic parameterized model and determining the structure for the nonlinear approximator substantially concurrently.

20. The method of claim 13, comprising storing the trained nonlinear approximator and the trained dynamic parameterized model as a trained parametric universal nonlinear dynamic approximator.

21. The method of claim 12, comprising providing output of the nonlinear approximator from a previous cycle as input to the nonlinear approximator for a current cycle.

22. The method of claim 12, wherein the dynamic parameterized model comprises a multi-input (MIMO) dynamic model implemented with a set of difference equations.

23. The method of claim 22, wherein the set of difference equations comprises a set of discrete time polynomials.

24. The system of claim 12, the one or more parameters of the nonlinear physical process exclude outputs of the nonlinear process.

* * * * *